US012103778B2

(12) United States Patent
Valinsky et al.

(10) Patent No.: US 12,103,778 B2
(45) Date of Patent: Oct. 1, 2024

(54) MATERIAL HANDLING APPARATUS HAVING SEPARATE WORKSTATION AND METHOD OF USE

(71) Applicant: OPEX Corporation, Moorestown, NJ (US)

(72) Inventors: Joseph Valinsky, Moorestown, NJ (US); Alexander Stevens, Moorestown, NJ (US); Nathan Bloch, Moorestown, NJ (US); George Muttathil, Moorestown, NJ (US); David Baines, Moorestown, NJ (US)

(73) Assignee: OPEX Corporation, Moorestown, NJ (US)

( * ) Notice: Subject to any disclaimer, the term of this patent is extended or adjusted under 35 U.S.C. 154(b) by 0 days.

(21) Appl. No.: 18/378,270

(22) Filed: Oct. 10, 2023

(65) Prior Publication Data

US 2024/0109727 A1    Apr. 4, 2024

Related U.S. Application Data

(63) Continuation of application No. 17/854,467, filed on Jun. 30, 2022, now Pat. No. 11,820,601, which is a continuation of application No. 17/403,814, filed on Aug. 16, 2021, now Pat. No. 11,713,193.

(60) Provisional application No. 63/065,524, filed on Aug. 14, 2020.

(51) Int. Cl.
  *B65G 1/137*    (2006.01)
  *B65G 1/04*    (2006.01)

(52) U.S. Cl.
  CPC ......... *B65G 1/1378* (2013.01); *B65G 1/0464* (2013.01); *B65G 1/0492* (2013.01)

(58) Field of Classification Search
  CPC ... B65G 1/1378; B65G 1/0464; B65G 1/0492
  See application file for complete search history.

(56) References Cited

U.S. PATENT DOCUMENTS

| 6,805,526 | B2 | 10/2004 | Stefani |
| 9,499,340 | B2 | 11/2016 | Vardanyan |
| 10,464,762 | B2 | 11/2019 | Girtman |
| 11,298,786 | B2 | 4/2022 | Lang |

(Continued)

FOREIGN PATENT DOCUMENTS

WO    2016172253    10/2016

OTHER PUBLICATIONS

Written Opinion of the International Searching Authority issed in PCT Application No. PCT/US21/46188 on Feb. 17, 2022.

(Continued)

*Primary Examiner* — Saul Rodriguez
*Assistant Examiner* — Ashley K Romano
(74) *Attorney, Agent, or Firm* — Brian Dinicola

(57) ABSTRACT

A workstation for a material handling system is provided. The system may include a plurality of vehicles for retrieving items from a plurality of storage locations located in one or more racks. The workstation is configured to accommodate the vehicles so that the vehicles drive into the workstation and drive upwardly along a track in the workstation. In one configuration, the track is configured to tilt the vehicle at a predetermined angle relative to the horizon as the vehicle is driven upwardly. After the vehicle is tilted to the predetermined angle the vehicle continues to drive upwardly while maintaining the predetermined angle.

23 Claims, 17 Drawing Sheets

(56) References Cited

U.S. PATENT DOCUMENTS

| | | |
|---|---|---|
| 11,318,499 B2 | 5/2022 | Kalouche |
| 11,319,149 B2 | 5/2022 | Lynch |
| 11,507,100 B2 | 11/2022 | Sibley |
| 2008/0184552 A1 | 8/2008 | Lang |
| 2017/0226764 A1 | 8/2017 | Nussbaum |
| 2018/0148259 A1 | 5/2018 | Gravelle |
| 2018/0251302 A1 | 9/2018 | Valinsky et al. |
| 2018/0305123 A1 | 10/2018 | Lert, Jr. et al. |
| 2018/0346247 A1 | 12/2018 | DeWitt et al. |
| 2019/0375590 A1 | 12/2019 | Gravelle |
| 2020/0223630 A1 | 7/2020 | Lert |
| 2020/0385209 A1 | 12/2020 | Garcia |

OTHER PUBLICATIONS

International Search Report issued in PCT Application No. PCT/US21/46188 on Feb. 17, 2022.

Examination Report issued in Europe for Application No. 21856873 on Jun. 14, 2024.

MATERIAL HANDLING APPARATUS HAVING SEPARATE WORKSTATION AND METHOD OF USE

PRIORITY CLAIM

This application claims priority to U.S. patent application Ser. No. 17/854,467 filed on Jun. 30, 2022, which claims priority to U.S. patent application Ser. No. 17/403,814 filed on Aug. 16, 2021, which claims priority to U.S. Provisional Patent Application No. 63/065,524 filed on Aug. 14, 2020. The entire disclosure of each of the foregoing applications is hereby incorporated herein by reference.

FIELD OF THE INVENTION

The present invention relates to a material handling system for storing or retrieving items. More specifically, the present invention relates to a material handling system incorporating a plurality of destination areas and a plurality of vehicles for carrying items to and/or from the destination areas and to and/or from one or more workstations.

BACKGROUND OF THE INVENTION

Storing and retrieving items to fill a customer order can be laborious and time consuming, especially in a system that stores thousands of items. Storing and retrieving items from thousands of storage areas requires significant labor to perform manually. In many fields, automated picking has developed to reduce labor cost and improve customer service by reducing the time it takes to fill a customer order. However, the known systems of automatically handling the materials are either very expensive or have limitations that hamper their effectiveness. Accordingly, there is a need in a variety of material handling applications for automatically storing and/or retrieving items.

SUMMARY OF THE INVENTION

The present invention provides a number of inventive aspects that relate to material handling and/or storage and retrieval processes.

According to one aspect, a pick station for a material handling system having a plurality of independently operable vehicles delivering items is provided. The pick station optionally includes a housing. The housing may have an opening configured to facilitate the vehicle entering the pick station. Additionally, the pick station includes a track having a fixed track positioned within the housing so that vehicles driving through the opening in the housing drive into operative engagement with the fixed track. The fixed track may be configured to guide vehicles vertically upwardly. Additionally, the track may include a lower section having a curved profile to tilt the vehicle to a predetermined angle relative to the horizon. The track may also include an upper section having a substantially straight profile to raise the vehicle at the tilted angle for a predetermined distance.

According to a further aspect, a pick station may include a monitor for identifying the items to be removed from the container delivered to the pick station by a vehicle.

According to another aspect, a pick station may include a track that includes a plurality of vertical tracks.

According to a further aspect, a pick station may include a track that includes a plurality of teeth.

According to a yet another aspect, a pick station may include a track having a first track element having a lower section having a first tooth pitch and an upper section having a first tooth pitch. Optionally, the track may have a second track element opposing the first track element and having the first tooth pitch along substantially the entire length of the second track element.

According to a further aspect, a method may be provided for charging a material handling vehicle configured to drive along a first pathway in a horizontal direction and a second pathway in a vertical direction. Each vehicle may include a power storage element. The method may include the step of driving a vehicle having an item to a pick station having a charging element that includes a conductive element configured to provide a charging current to the vehicle to charge the power storage element of the vehicle. The method may also include the step of displacing an electrical contact of the vehicle into engagement with the charging element. Optionally, the vehicle may be raised at the pick station while the electrical contact maintains electrical engagement with the charging element. Additionally, the charging element may be displaced while the vehicle is raised upwardly at the pick station.

According to another aspect, a method is provided for charging a material handling vehicle that includes the step of driving the vehicle upwardly at a pick station.

According to a further aspect, a method is provided for charging a material handling vehicle having a step of driving the vehicle upwardly by actuating a drive assembly of the vehicle.

According to yet another aspect, a method is provided for charging a material handling vehicle that includes the step of displacing the charging element and the step of displacing includes the step of vertically displacing the charging element to maintain the charging element in operative engagement with the charging contact of the vehicle as the vehicle is raised upwardly.

According to a further aspect, a method for charging a material handling vehicle includes the step of biasing the charging element in a vertical direction relative to the charging contact of the vehicle. Optionally the method may additionally or alternatively include the step of biasing the charging element in a horizontal direction relative to the charging contact of the vehicle.

According to another aspect, a method for charging a material handling vehicle may include the step of driving a vehicle with a container to the pick station. Optionally, the method may include the step of driving the vehicle upwardly to an upper position so that the container is positioned at an elevated position to present the container to an operator at the pick station.

The present invention also provides a method for delivering items from a storage system to a pick station. The method for delivering items includes the step of driving a vehicle having a container to a pick station. The vehicle drives upwardly at the pick station to an upper position to displace the container to an elevated position to present the container to the operator. The container may be releasably retained in the elevated position. Optionally, the vehicle may be driven downwardly away from the upper position while the container is retained in the elevated position. Driving the vehicle downwardly while the container is retained in the elevated position may operate to separate the vehicle from the container. The method may also include the step of driving one or more subsequent vehicles to the pick station to deliver items to be placed in the container while the container is retained in the elevated position.

According to another aspect, a method for delivering items from a storage system to a pick station may include the steps of driving a retrieval vehicle upwardly at the pick station to the upper position into operative engagement with the container while the container is retained in the elevated position. Additionally, the method may include the step of releasing the container. Optionally, the method may include the step of driving the retrieval vehicle downwardly with the released container. Additionally, the method may include the optional step of driving the retrieval vehicle horizontally away from the pick station after the step of driving the vehicle downwardly.

According to another aspect, the present invention may provide a workstation for presenting items carried by vehicles having a horizontal drive system for driving the vehicles horizontally along the ground and a vertical drive system for driving the vehicle vertically. The workstation may include a track system that includes a rear track having a plurality of drive teeth, a front track having a plurality of drive teeth, and a carriage. The carriage optionally includes a first transfer mechanism cooperable with the rear track to drive the carriage upwardly and a second transfer mechanism cooperable with the front track to drive the carriage upwardly. The first and second transfer mechanisms may be configured to engage the vertical drive system of the vehicle so that power from the vertical drive system is transferred through the first and second transfer mechanisms to drive the carriage up the track system to present an item on the vehicle to an operator at the pick station.

According to another aspect, the present invention may provide a workstation having first and second transfer mechanisms and one of the transfer mechanisms optionally includes a first gear having a first tooth pitch and a second gear element having a second tooth pitch. Optionally, the workstation may include a front track having a first segment having a tooth pitch corresponding with the first tooth pitch and a second segment having a tooth pitch corresponding to the second tooth pitch. Optionally, the first segment includes a curved profile configured to tilt the vehicles to a predetermined angle and the second segment is generally straight.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
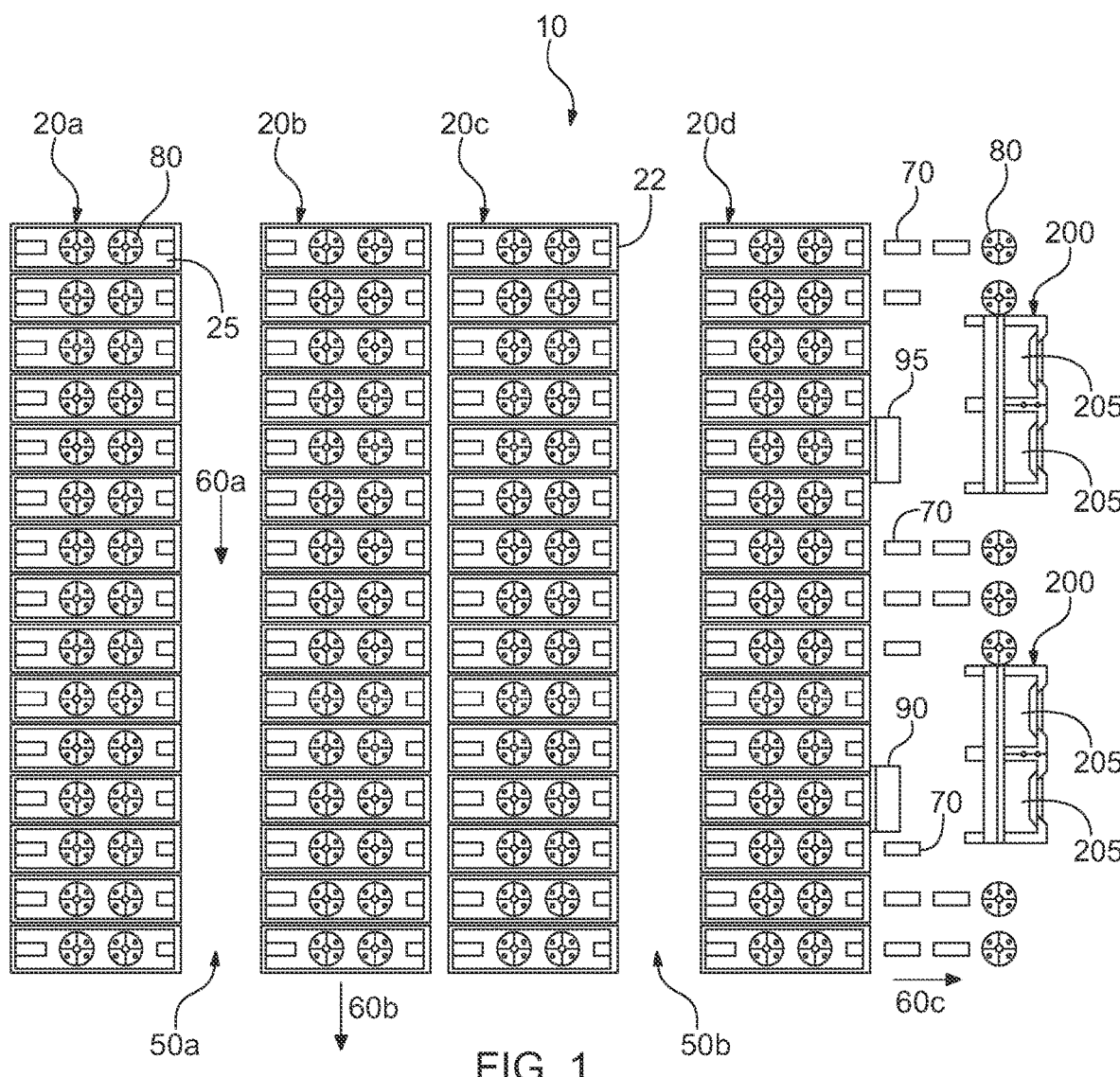
FIG. 1 is a diagrammatic plan view of a material handling system.

Referring now to the figures in general and to FIG. 1 specifically, an apparatus for sorting or retrieving items is designated generally 10. The apparatus 10 includes one or more mechanisms for retrieving items from one of a plurality of locations, such as storage areas 25 located in racks 20. The retrieval mechanism may include one or more vehicles that retrieve items from the storage locations and deliver the items to a workstation 200 where an operator can retrieve the item from the vehicle. The vehicle then returns to a storage area in the rack to store any remaining items that were not retrieved by the operator. The vehicle can then advance to another storage area to obtain the next item to be retrieved. In this way, the system may include a mechanism for continuously storing and retrieving items to/from the various storage areas so that the items can be presented to an operator.

It should be understood that various items and subassemblies of the overall system can be used alone or in combination with material handling systems having different structure or operation to the system illustrated in the Figures and described below.

The material handling system 10 may include any of a variety of different systems for storing items. For instance, the material handling system may include a system that incorporates a plurality of autonomous vehicles such as the system described in U.S. patent application Ser. No. 16/992,703, publication as no. 2021/0047117 on Feb. 18, 2021. The entire description of U.S. application Ser. No. 16/992,703 is hereby incorporated herein by reference.

Figure 2:
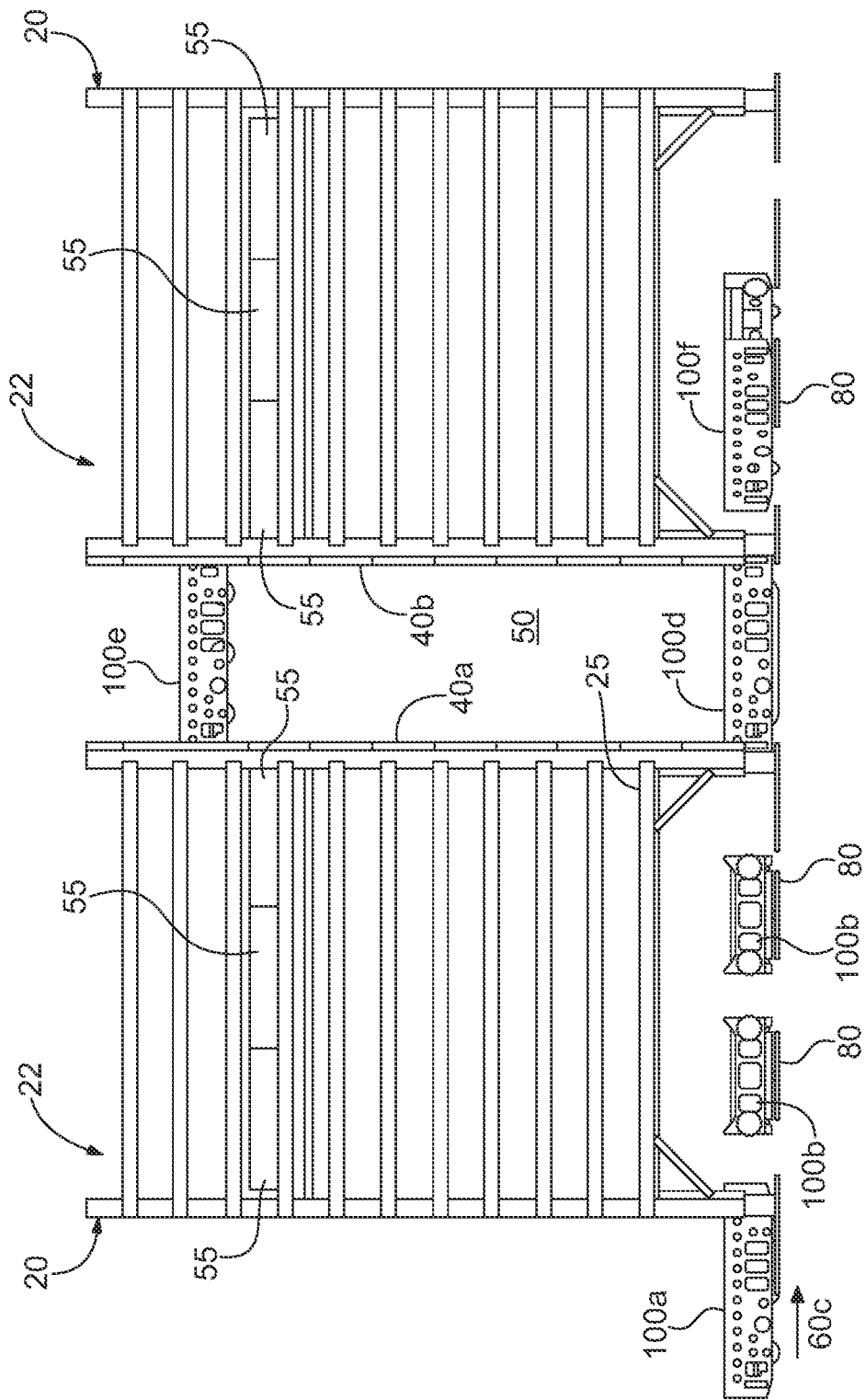
FIG. 2 is a fragmentary side elevation view of a portion of the material handling system illustrated in FIG. 1.

As illustrated in FIG. 1, the material system may optionally incorporate one or more racks 20. Each rack may include a plurality of storage locations 25. Optionally, the storage locations may be arranged into one or more vertical columns 22. For instance, FIG. 1 illustrates a plurality of racks 20 and each rack may include a plurality of columns 22, each of which includes a plurality of storage locations. The items that are handled by the system may be stored directly in the storage locations. Alternatively, the items may be stored in bins or totes 55 and the storage locations 25 may be configured to store the totes 55 as shown in FIG. 2.

Accordingly, it should be understood that unless stated otherwise in the following description, when a tote is mentioned, the term tote is broad enough to include a container for containing one or more items as well as simply being an item that is not necessarily contained in a container.

Referring again to FIG. 1, the system may include a plurality of racks 20 that optionally may be positioned to form rows or aisles 50. For instance, a first rack 20a may be spaced apart from a second rack 20b so that an aisle 50a is formed between the two racks. In particular, the first rack 20a may be substantially parallel to the second rack to form an aisle having a substantially uniform width. Additionally, the system may include a plurality of racks forming a plurality of aisles 50. Although the aisles 50 are illustrated in FIG. 1 as being parallel, it should be understood that if the system incorporates a plurality of racks 20, the racks may be arranged in a variety of configurations and if the system includes a plurality of aisles 50, the aisles need not be parallel.

Optionally, the system includes an automated element for storing and retrieving totes from the storage locations. One such automated element is an autonomous vehicle. For example, as discussed further below, the automated element may include a plurality of autonomous vehicles 100. Additionally, the automated vehicles 100 may be configured to transport the totes 55 to workstations 200. At the workstation 200, one or more items may be removed from a tote on one of the vehicles 100. In one embodiment, a human operator may remove an item from the vehicle. However, it should be understood that an automated mechanism may remove the item from the vehicle. Accordingly, it should be understood that the operator that handles items at the workstation(s) 200 may be a human operator or an automated mechanism or a combination of the two.

The system 10 and/or various components of the system may be controlled by a central controller 90, such as a microcomputer. The central computer may receive signals from various elements, such as sensors and control various aspects of the system based on signals received from the various components. The central controller may also store data regarding the location of various items to be retrieved from the system. Additionally, the central controller may include data regarding the identification of items to be retrieved, such as a number of items to fill customer orders, as well as the quantity of such items. In this way, the central controller may control and coordinate the operation of various elements to schedule the retrieval and processing of a variety of items from the storage locations.

Rack System

As noted above, the system may include one or more racks 20 having a plurality of storage locations 25. The details of an exemplary storage rack 20 are illustrated in FIGS. 1 and 2. However, it should be noted that the system may include any of a variety of elements for organizing a plurality of storage locations 25.

Referring to FIG. 2, each rack may include a plurality of support legs that extend substantially vertically and a plurality of brackets that extend substantially horizontally interconnecting the support legs. The brackets may be planar elements forming shelves so that the shelves form storage locations. However, in the embodiment illustrated in FIG. 2, the horizontal brackets are L-shaped brackets that form horizontal ledges to support edges of the totes 55. The horizontal brackets may be spaced apart from one another up the height of the vertical legs to form a column 22 of vertically spaced apart storage locations 25.

As discussed above, the system may include a plurality of racks that are spaced apart to form one or more aisle 50. Optionally, a track 40 may be positioned along one or more of the racks and the track may be configured to guide vehicles vertically so that the vehicles may be conveyed up and down the column 22 to the storage locations in the column. Additionally, it may be desirable to position a first track along a rack on one side of the aisle, such as along rack 20a and a second track along a rack on the opposite side of the aisle, such as along rack 20b. The vehicles 100 may be configured so that the vehicle travels in the aisle 50a traveling vertically along a track on rack 20a while simultaneously travelling vertically along a track on rack 20b.

If the system utilizes one or more vehicles and one or more racks, the racks may be configured to allow the vehicles to travel under the racks 20 as well as being able to travel across or along any aisles that may be incorporated into the system. For instance, referring to FIG. 1, the vehicles may follow a path that moves along one or more path segments that may be parallel or transverse to the aisle. A first such path is designated as path 60a. Path 60a is within and parallel to aisle 50a. A second such path is designated path 60b, which is parallel to the length of aisle 50a, but spaced apart from the aisle. Specifically, path 60b is located under rack 20b. Rack 20b may be configured to provide clearance for movement of the vehicle under the lowermost storage location 25 so that the vehicle may travel under the rack 20b along a path 60b that is parallel to the length of the aisle. A third path is designated 60c, which is transverse 60a and 60b. As shown in FIGS. 1 and 2, path 60c is parallel to the depth of each column 22.

FIG. 2 illustrates a plurality of vehicles in different orientations relative to the racks 20 and the storage locations 25. For instance, a first vehicle 100a is oriented for horizontal movement along path 60c, transverse the length of aisle 50. A second vehicle 100b is oriented for horizontal movement under the rack along path 60b that is parallel to the length of the aisle 50. Additionally, a third vehicle 100d is positioned within the aisle 50 to climb vertical tracks along the racks 20 on either side of the aisle. A fourth vehicle 100e is also positioned within the aisle and has climbed up the track 40a,b to a storage location 25 in an upper portion of the column 22. Finally, a fifth vehicle 100f is positioned under the rack 20 and is oriented at an intermediate position between the orientation of vehicle 100a and the orientation of vehicle 100b. In particular, the racks may be configured to facilitate the vehicles turning horizontally underneath the racks. The fifth vehicle 100f illustrates the vehicle in the process of turning under the rack from a first path to a second path.

Vehicles

Figure 3:
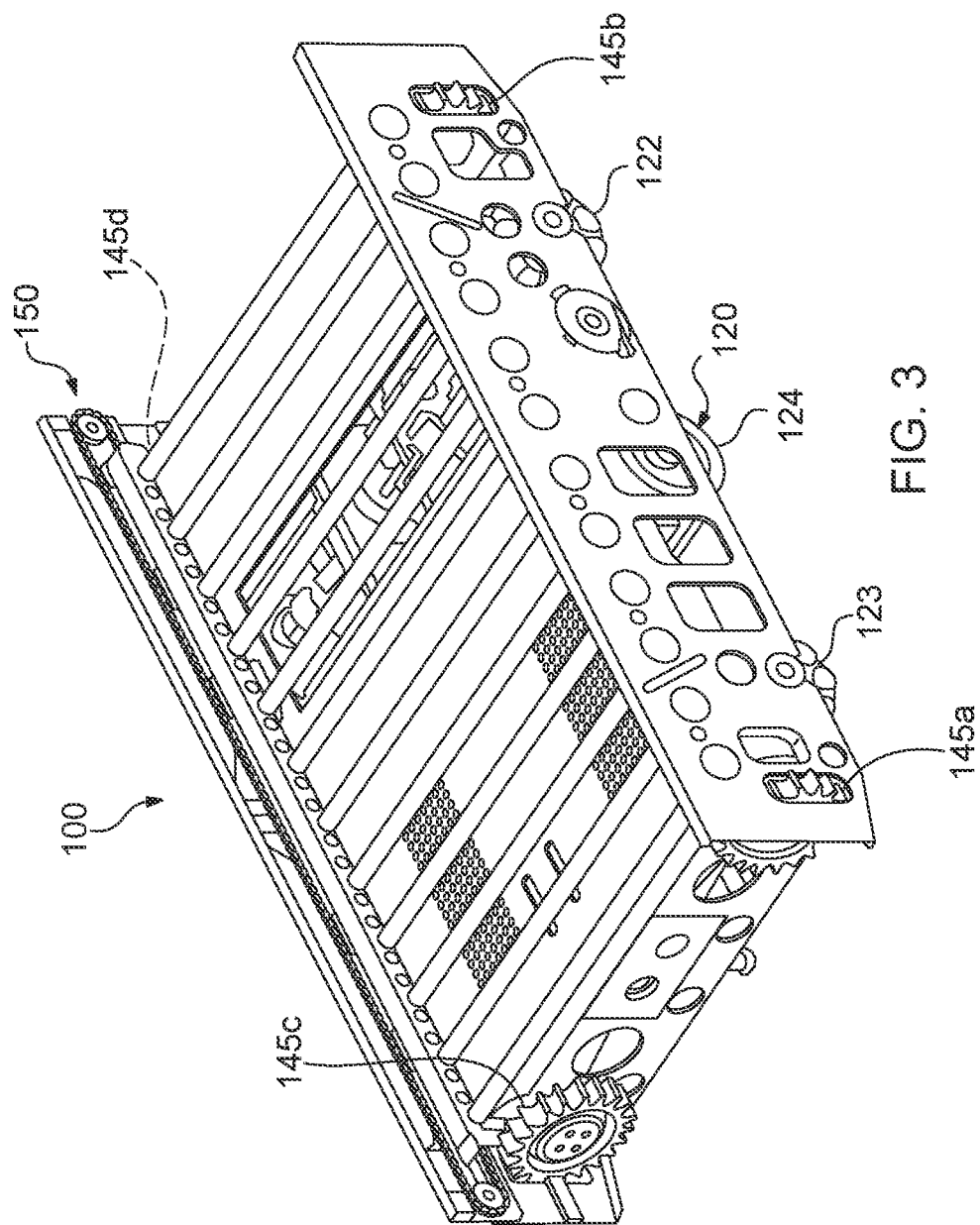
FIG. 3 is a perspective view of a vehicle for use with the material handling system illustrated in FIG. 1.

FIG. 3 illustrates details of one of the vehicles 100 that are shown in FIG. 2. As noted above, if the system incorporates vehicles, the structure of the vehicle may vary. Accordingly, it should be understood that each of the vehicle's features discussed below are optional features that may be varied or eliminated depending on the application.

The vehicles 100 may be autonomous systems that include an onboard power supply for driving the vehicle. The vehicles may also include a communication system for wirelessly receiving and transmitting control signals between each vehicle and a control element, such as the central controller 90. In this way, the vehicle may receive control signals regarding the location for retrieving an item and the location to which the vehicle is to deliver the item.

The vehicle illustrated in FIG. 3 includes a horizontal drive assembly 120 for driving the vehicle 100 in a horizontal direction. The horizontal drive 120 may be configured to drive the vehicle along a track or along an open horizontal surface, such as a floor. For instance, one option for a horizontal drive includes a plurality of rotatable elements, such as wheels or rollers. One or more drive mechanisms may be provided for turning the rotatable elements. Additionally, the rotatable elements may turn from side to side to steer the vehicle.

Figure 4:
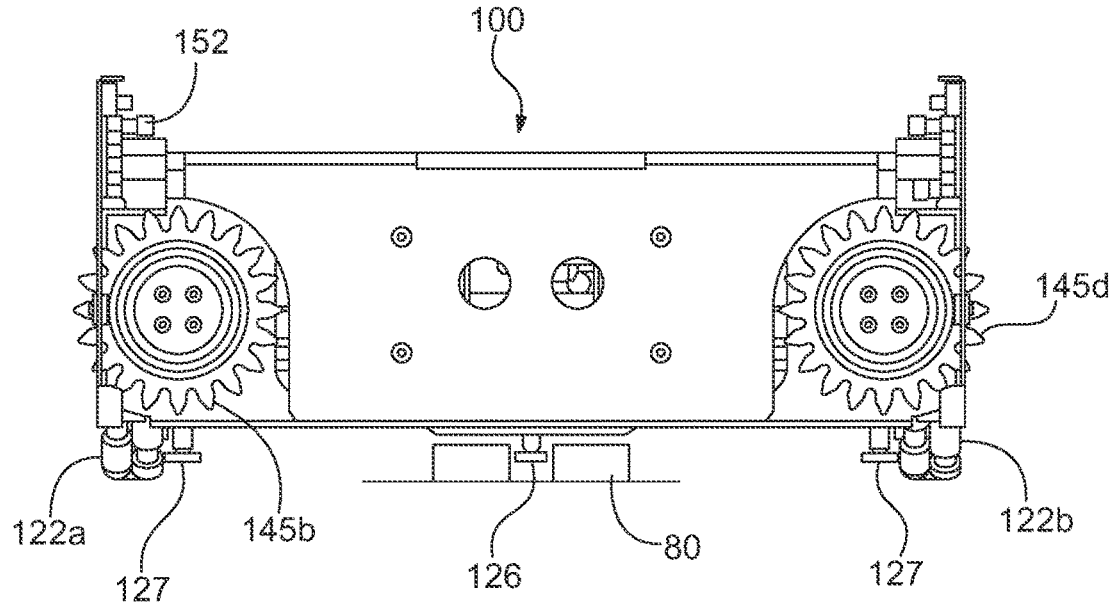
FIG. 4 is an end view of the vehicle illustrated in FIG. 3.
Figure 5:
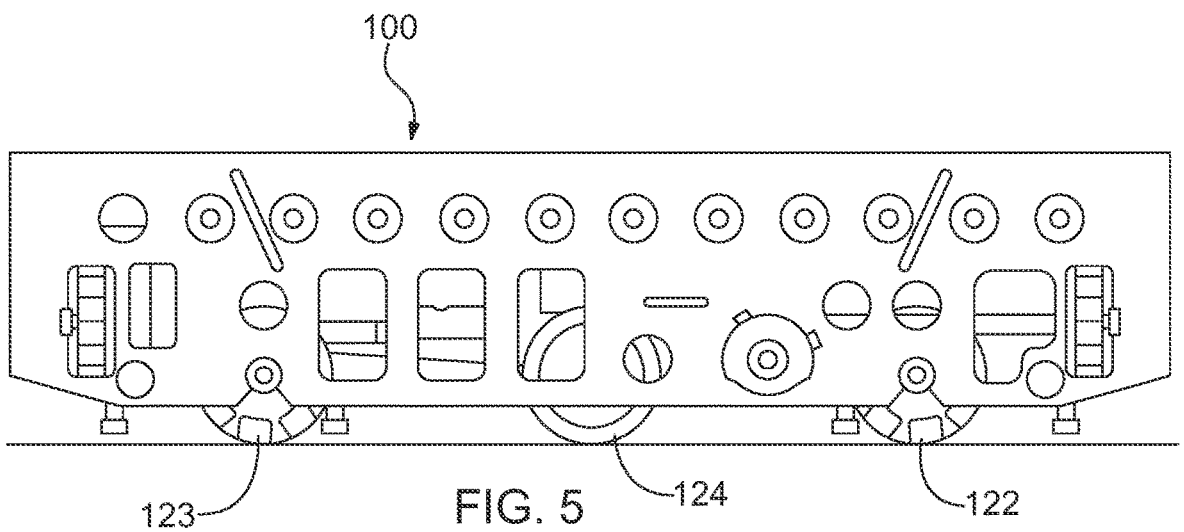
FIG. 5 is a side elevational view of the vehicle illustrated in FIG. 3.

Alternatively, as illustrated in FIGS. 3-5, the vehicle may have a horizontal drive 120 formed of a plurality of rollers 122, 123, 124 that are rotatable around a first axis, such as around an axle. Additionally, the rollers 122, 123, 124 may be constrained to rotation about a single axis. For example, in the embodiment illustrated in FIGS. 3-5, the horizontal drive 120 includes a pair of central rollers 124 and first and second sets of outer rollers 122, 123. The first set 122 is positioned forward of the central rollers while the second set of rollers 123 is positioned rearwardly of the central rollers 124. The outer rollers 122, 123 may include rollers spaced apart along the length of a horizontal axle so that each set of outer rollers includes a first roller 122a on one side of the vehicle and a second roller 122b on an opposite side of the vehicle as shown in FIG. 4. Additionally, as shown in FIG. 4, each set of outer rollers may include a pair of rollers 122b on each side of the vehicle.

As noted above, the vehicle 100 may have any of a variety of steering mechanisms for controlling the direction of travel of the vehicle. For example, an optional steering mechanism is a zero-turn mechanism that can turn the vehicle without substantially moving forwardly. Optionally, the zero-turn mechanism provides a means for turning the vehicle about a vertical axis extending through the vehicle.

The zero-turn mechanism comprises a linkage that allows the wheels or rollers on one side of the vehicle to rotate at a different speed than the wheels or rollers on the opposing side of the vehicle. Optionally, the linkage allows the wheels or rollers on one side of the vehicle to rotate in different directions than the wheels or rollers on the opposing side of the vehicle. In this way, by varying the speed and/or rotational direction of the wheels on one side of the vehicle relative to the speed and/or rotational direction of the wheels on the opposing side of the vehicle, the zero-turn mechanism changes the direction of travel to steer the vehicle.

Optionally, the system may also include one or more guides 80 to guide or align the vehicles as they travel. For instance, referring to FIG. 4, the guide 80 may include a channel or groove and the vehicle may include a corresponding guide element that cooperates with the guide 80 to control movement of the vehicle 100. One example of a guide element is a follower 126. The follower may be any element configured to engage with or cooperate with the guide 80. In the present instance, the vehicle 100 includes a central follower 126 that includes a rotatable element such as a bearing that rotates about a vertical axis. The central follower 126 engages the channel in the guide 80 to constrain horizontal movement of the vehicle.

Optionally, the vehicle may also include one or more lateral guide member 127. The lateral guide members 127 may cooperate with an outer surface of the guide 80 to constrain movement of the vehicle. For instance, guides 80 may comprise circular guides having a circumferential surface for guiding the rotation of the vehicles. The vehicle may have a pair of lateral guide members 127 spaced apart from one another a distance equal to the diameter of the circumferential surface of the guide. In this way, the lateral guides 127 engage the circumferential surface of the guide to constrain the vehicle to rotational motion.

In addition to the horizontal drive mechanism 120 the vehicle may also include a vertical drive mechanism 140 for driving the vehicle 100 vertically within the rack 20. In particular, as noted above, the system may include a guide mechanism such as a track 40 that is disposed adjacent the rack 20. The vertical drive mechanism 140 may be configured to cooperate with the vertical guide mechanism 40 to drive the vehicle 100 vertically.

FIGS. 3-4 illustrate an exemplary vertical drive 140 that includes a plurality of rotatable gears 145, however, it should be understood that the vertical drive 140 may include any of a number of drive mechanisms for driving the vehicle vertically. Referring to FIG. 4, the vertical drive may include drive gear 145 that rotates about a horizontal axis that is transverse the horizontal axis of rotation of the horizontal drive mechanism 120. In particular, optionally, the vehicle includes a pair of drive gears 145 that are spaced apart from one another so that teeth of a first one of the gears 145b project outwardly from a first side of the vehicle and teeth of a second one of the gears 145d project outwardly from a second side of the vehicle as shown in FIG. 4. These first and second gears 145b,d may be synchronously driven. Additionally, as shown in FIG. 3, the vehicle may include two pairs of vertical drive elements that are spaced apart from one another along the length of the vehicle. In particular, optionally, the vehicle includes a first pair of vertical drive elements 145a,c at a first end of the vehicle and a second pair of vertical drive elements 145b,d at a second end of the vehicle.

Referring to FIGS. 2 and 3, the rack 20 may be configured so that the track 40a on one rack is spaced apart from the track 40b on a second rack a distance corresponding to the spacing between the first set of vertical drive elements 145a and the second set of drive elements 145b. In this way, the first vertical drive element 145a may cooperate with the first track 40a to drive the vehicle up the first track 40a, while the second vertical drive element 145b may cooperate with the second track 40b to drive the vehicle up the second track 40b. Optionally, the two vertical drive elements 145a,b are synchronously driven so that the vehicle maintains a horizontal orientation as the vehicle moves from horizontal movement to vertical movement.

The vertical drive 140 may optionally be configured so that vertical drive has a width that remains substantially constant as the vehicle transitions from horizontal movement to vertical movement. In this way, the vertical drive 140 need not telescope or extend outwardly to transition from horizontal driving to vertical driving. For example, referring to FIGS. 3-4 forward climbing gears 145b and 145d each have a horizontal axis of rotation and the spacing between the horizontal axis of rotation of drive member 145b is fixed relative to the horizontal axis of rotation of drive member 145d while the vehicle is moving horizontally and while the vehicle is climbing.

The vehicle may also include an optional transfer mechanism for transferring items between the vehicle and a destination, such as a storage location.

The transfer mechanism 150 may be operative to transfer an item between a platform surface of the vehicle and one of the plurality of destination areas 25. As shown in FIG. 3, the platform surface is optionally defined by the exterior surfaces of a plurality of rollers.

The transfer mechanism 150 may be any of a variety of mechanisms for loading items onto the vehicle and for unloading items from the vehicle into one of the storage areas. Additionally, the transfer mechanism 150 may be specifically tailored for a particular application. In the present instance, the transfer mechanism 150 comprises one or more displaceable element(s) configured to engage an item stored at a storage location and pull the item onto the vehicle. More specifically, in the present instance, the vehicle includes one or more displaceable element(s) configured to move toward a tote in a storage location and releasably engage the tote. After the displaceable element(s) engage the tote, each displaceable element is displaced away from the storage location, thereby pulling the tote onto the vehicle 100.

The displaceable element of the transfer mechanism may be any of a variety of items, such as a bar, rod, or another element configured to engage an item, for example, a tote. For example, referring to FIGS. 3-4, the transfer mechanism 150 may include one or more displaceable pins 152. Additionally, the transfer mechanism may include a drive element for displacing the pins 152. For instance, optionally, the transfer mechanism 150 includes two drive elements in the form of endless carriers such as a drive belt or drive chains 154. Optionally, each pin 152 projects or extends inwardly toward the longitudinal center line of the vehicle. The transfer mechanism is preferably configured to cooperate one of the totes to releasably engage the tote. For example, in the present instance, the pins 152 are configured to mate with a recess on the tote so that the transfer mechanism can engage the tote. However, it should be recognized that the transfer mechanism may include any of a variety of elements for engaging items to be transferred onto or off of the vehicle.

The vehicle includes one or more drive elements for driving the transfer mechanism. Optionally, the vehicle includes one or more motors that drive the transfer mechanism 150. For instance, one or more motors of the vehicle drive system may drive the chains 154 to selectively move the chains and pins 152 toward or away from storage locations.

As the vehicle approaches a storage location to retrieve a tote, the chains may drive the displaceable pins 152 toward the storage location so that the pins underlie a groove or notch in the bottom of the tote. The vehicle travels a small distance upward until the pins 152 are disposed within the groove or notch of the tote. The chain 154 then reverses so that the pins 152 move away from the storage location. Since the pins engage the tote within the notch, when the pins move away from the storage location, the pins pull the tote onto a surface of the vehicle. In this way, the transfer mechanism 150 is operable to retrieve items from a storage location. Similarly, to store an item in a storage location 25, the chains 154 of the transfer mechanism 150 drive the pins 152 toward the storage location until the item is in the storage location. The vehicle then moves downwardly to disengage the pins from the tote, thereby releasing the tote.

In this instance, as seen in FIG. 2, two or more totes, such as totes 55, may be coupled and decoupled from one another using mating connectors. Optionally, totes 55 may be coupled and decoupled from one another through a series of lifting and separating movements implemented by movement of the vehicle 100. Optionally, the transfer mechanism 150 may be actuated to pull a forward facing ("lead") tote onto a surface of the vehicle so as to be fully supported by vehicle 100. If the totes are releasably connected, this pulling motion advances the trailing tote (i.e., the one that is immediately behind the lead tote) into the aisle facing location. Optionally, the vertical drive mechanism of vehicle 100 is then operated to drive the vehicle 100 vertically to uncouple the lead tote from the trailing tote(s). Once decoupling is completed, the drive system may be actuated again to center the tote upon the vehicle 100.

The vehicle 100 may include a separate drive element for driving the transfer mechanism 150. Alternatively, the transfer mechanism may be interconnected with one of the horizontal or drive elements of the vehicle. Specifically, the transfer mechanism may be connected with one of the drive systems so that the drive system is selectively operable between driving the vehicle and driving the transfer mechanism.

For instance, the transfer mechanism may optionally be connected with one of the horizontal drive systems with a selectable connection so that in a first orientation the drive system drives the vehicle horizontally and in the second orientation the drive system drives the transfer mechanism. An optional clutch mechanism may be selectively engaged and disengaged to initiate and terminate transmission of power, respectively, from the motor(s) of the horizontal drive system to the transfer mechanism, whereby the second drive system may be operated independently of the transfer mechanism. In this instance, the clutch mechanism may be configured as two clutch sub-assemblies which are symmetrically arranged relative to a longitudinal centerline of vehicle 100.

Workstation

Referring now to FIGS. 6A-17, details of a workstation 200 that may be used in conjunction with or as part of an automated warehouse system 10 are illustrated. It should be understood that the workstation 200 is not limited to use in a particular automated warehouse system 10, so that features of the workstation 200 are independent of features of the automated warehouse system 10, such as the racks 20 and the elements utilized to retrieve items from the racks, such as the vehicles 100.

Figure 6A:
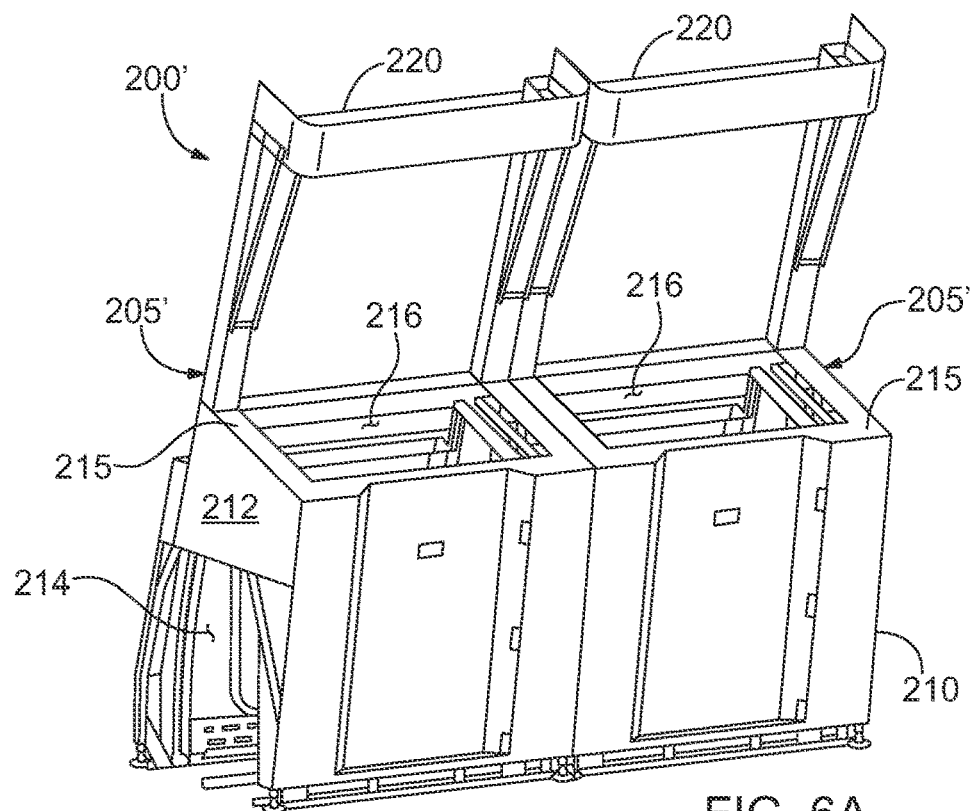
FIG. 6A is a perspective view of a workstation for use with the material handling system illustrated in FIG. 1.
Figure 6B:
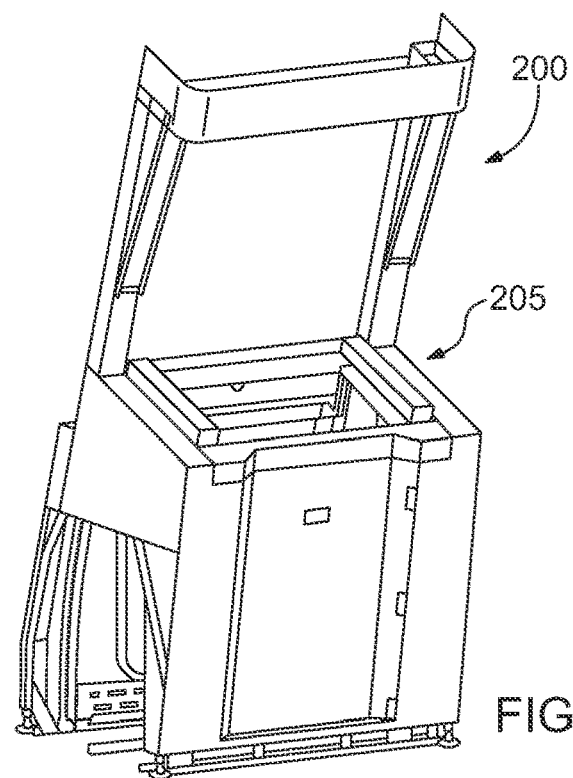
FIG. 6B is a perspective view of an alternate workstation for use with the material handling system illustrated in FIG. 1.

The workstation 200 may have a single work area, referred to as a pick station 205 as shown in FIG. 6B. Optionally, the workstation may have two work areas 205 located side by side as shown in FIG. 6A. In the following discussion, a single pick station 205 is described. It should be understood that if the workstation includes two pick stations, then each of the pick stations are configured substantially similarly.

The pick station 205 may optionally be configured to work together with independent vehicles such as the vehicles 100 described above. Accordingly, the pick station 205 may be configured to cooperate with the vehicles to raise the vehicles upwardly so that an operator can readily retrieve items from the vehicles while the operator is positioned at the pick station. For instance, the pick station 205 may incorporate an element for lifting each vehicle as the vehicle arrives at the pick station 205. The lift element may be driven by the pick station 205. For example, each pick station may include an elevator for lifting the vehicle and the pick station may include a motor or other mechanism for driving the elevator. Alternatively, as described below, the drive element for lifting the vehicle 100 may be provided by the vehicle.

The pick station 205 may include an enclosure 210 that provides a housing for the pick station. The enclosure may include side walls 212 and an upper surface 215. The housing may optionally include front legs 222 that support the front of pick station 205 and rear legs 224 that support the rear of the pick station. The front and rear legs 222, 224 may include adjustable feet that extend or retract to adjust the height of each leg. The side walls 212 may have openings 214 configured to allow the vehicles to drive into the pick station 205 through the side walls.

Figure 19:
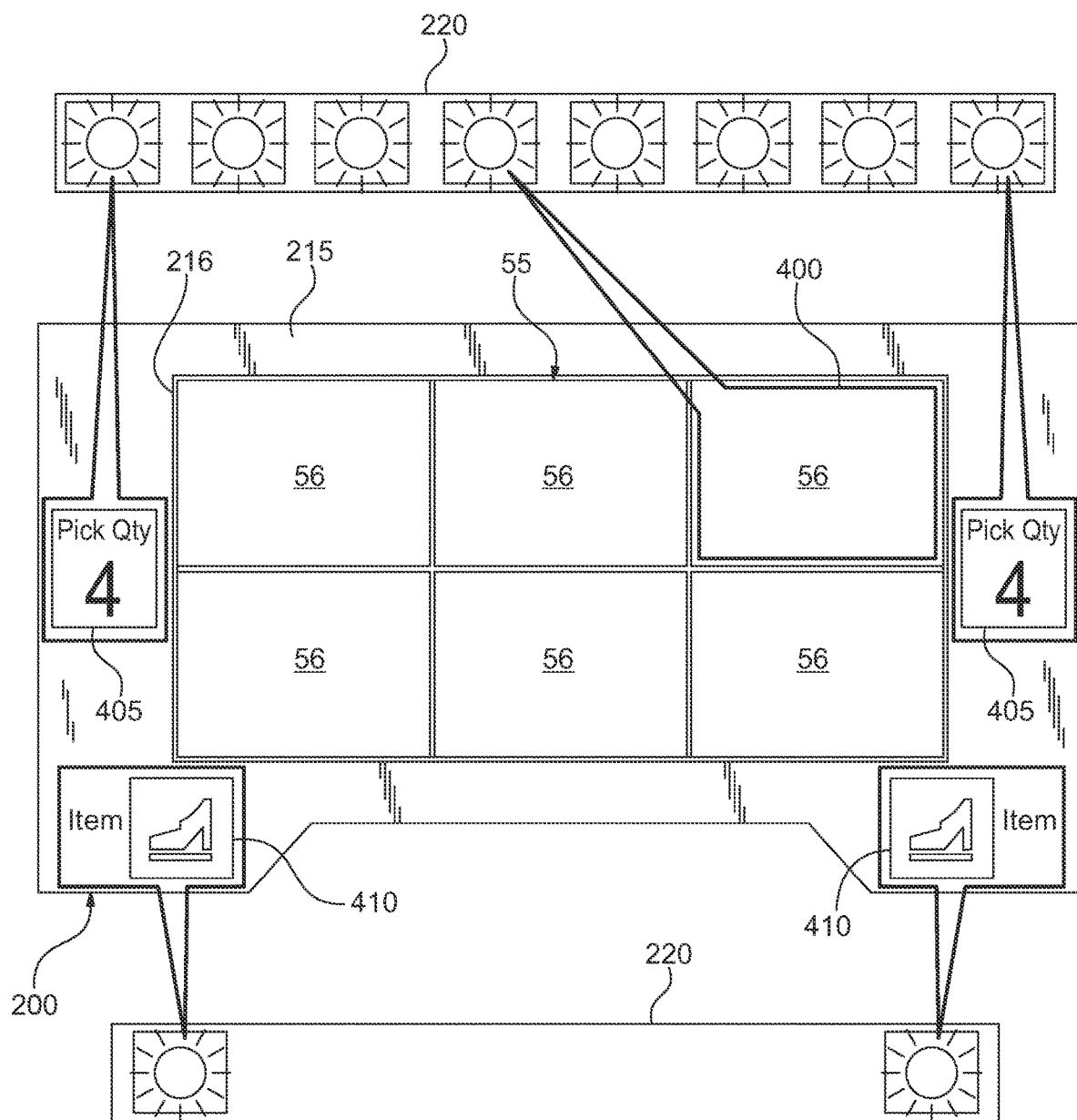
FIG. 19 is a diagrammatic overhead view of the workstation of FIG. 6B.

Referring to FIGS. 6A, 6B and 19, the upper surface 215 may have a pick opening 216 so that the operator can reach through the pick opening to retrieve an item that is carried on the vehicle 100. The pick opening 216 may have a length and a width that correspond with the length and width of totes 55 that may be used to store items in the storage racks 20. Optionally, each tote may have an upper rim defining an upper surface of each tote.

The inner length and width of the interior of the tote adjacent the rim may be substantially similar to the length and width of the pick opening 216. If the tote has such an optional configuration, the tote 55 may span the entire length and width of the pick opening so that when the tote is positioned within the pick opening the tote impedes passing between the rim of the tote and the edge of the pick opening. In particular, the tote is sized and configured to cooperate with the pick opening to prevent the operator's hand from passing between the tote and the pick opening. In other words, the tote may operate as a stop impeding an operator from extending an appendage through the pick opening 216 into the interior of the pick station 205.

Optionally, the workstation may include a projector 220 for projecting light and optionally images onto the workstation. The projector 220 may be mounted above the upper surface 215 for projecting light downwardly onto the upper surface and onto the area surrounded by the pick opening 216. The projector may be controllable by a central controller to selectably project light and images onto variable locations on the upper surface 216 and/or onto areas of the tote 55 when the tote is raised into an upper position as shown in FIG. 19.

As shown in FIG. 19, the upper surface 215 of the pick station 205 may frame the pick opening 216, thereby framing the tote 55. The upper surface 215 optionally provides a projection surface onto which the projector may project images that provide information for the operator. For instance, the projector 220 may project one or more images onto the upper surface and also project light onto a portion of the tote. In FIG. 19, the projector 220 projects a first image 405 onto the upper surface adjacent the tote. In this instance, the first image 405 represents the number of items to be removed from the tote 55. Optionally, as shown in FIG. 19, the projector may simultaneously project a second image 410 onto the upper surface adjacent the tote. The second image 410 provides a graphic representation of the item to be picked from the tote. Optionally, the projector may simultaneously provide an illumination beam 400 to illuminate a portion of the tote in which the item to be picked should be contained. For instance, the projector may illuminate the cell 56 from which the items should be picked.

The central controller monitors the vehicles and the cells within the totes carried by the vehicles. The central controller additionally monitors the number of items to be picked from a tote at a workstation. Accordingly, the central controller controls the projector so that when the tote is raised to the upper position, the projector projects one or more identifying indicia for the operator. Preferably, the central controller controls the projector to selectively project at least two indicia, at least one of which includes a graphical image projected onto a surface adjacent to the tote. The indicia are selectively projected in response to the tracking of the items in the totes and the data regarding the number of items required.

Doors

As discussed above, the pick station may optionally be configured to cooperate with the totes so that the totes block the pick opening 216 when the tote is raised up to the pick opening. Additionally, the pick station may include an optional removable cover that selectively covers the pick opening 216. For example, the pick station 205 may include a moveable closure mechanism or covering that overlies the pick opening to impede items from passing through the pick opening. In a first position, the closure covers the pick opening to operate as a barrier preventing items from passing through the pick opening; in a second position, the closure uncovers the pick opening to allow items to pass through the pick opening. In one embodiment, the closure may be a moveable door 230. In a first position, the door is closed to cover the pick opening. In a second position, the door moves away from the pick opening to uncover the pick opening as show in FIG. 6A.

Figure 8:
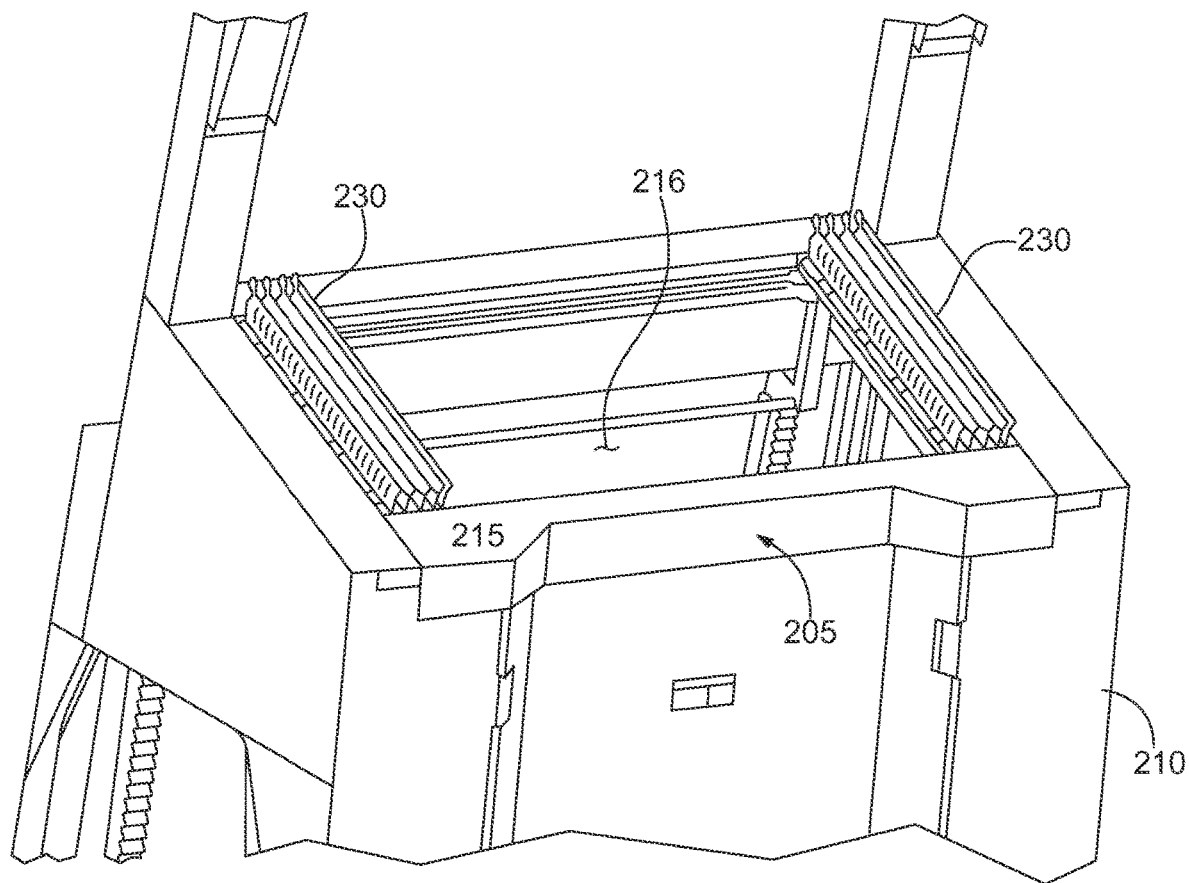
FIG. 8 is an enlarged fragmentary front perspective view of the workstation illustrated in FIG. 6A.
Figure 17:
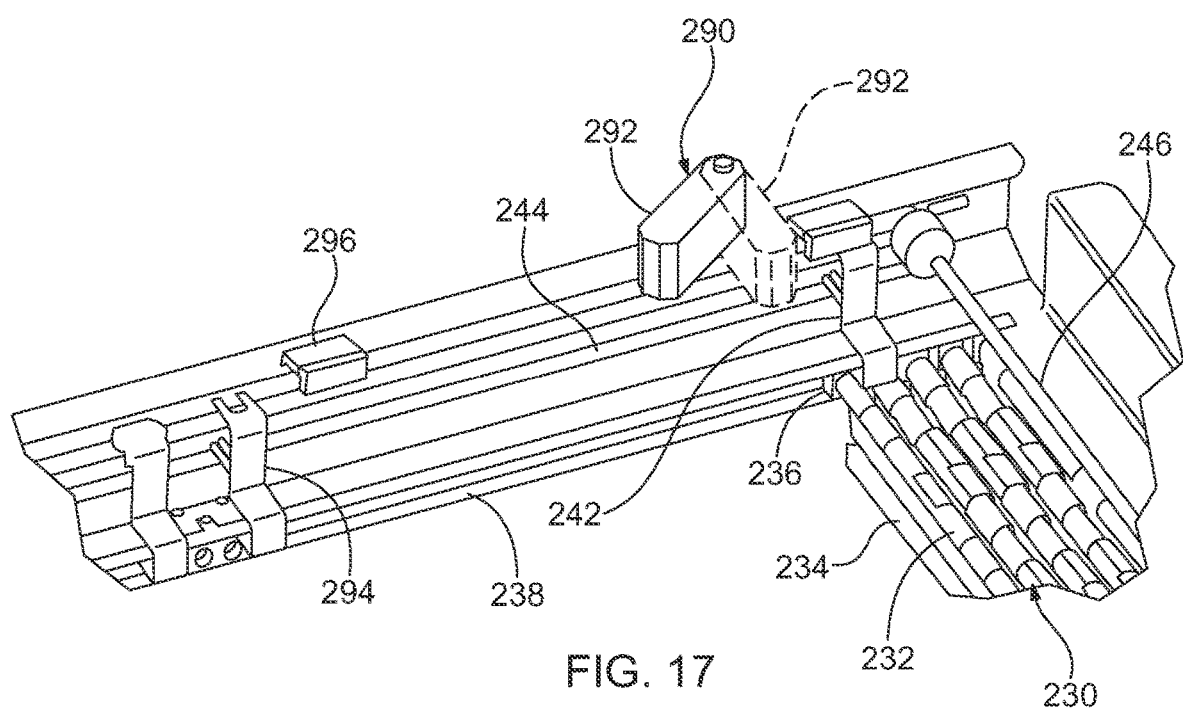
FIG. 17 is an enlarged fragmentary perspective view of the workstation illustrated in FIG. 6a illustrating details of a safety door.
Figure 18:
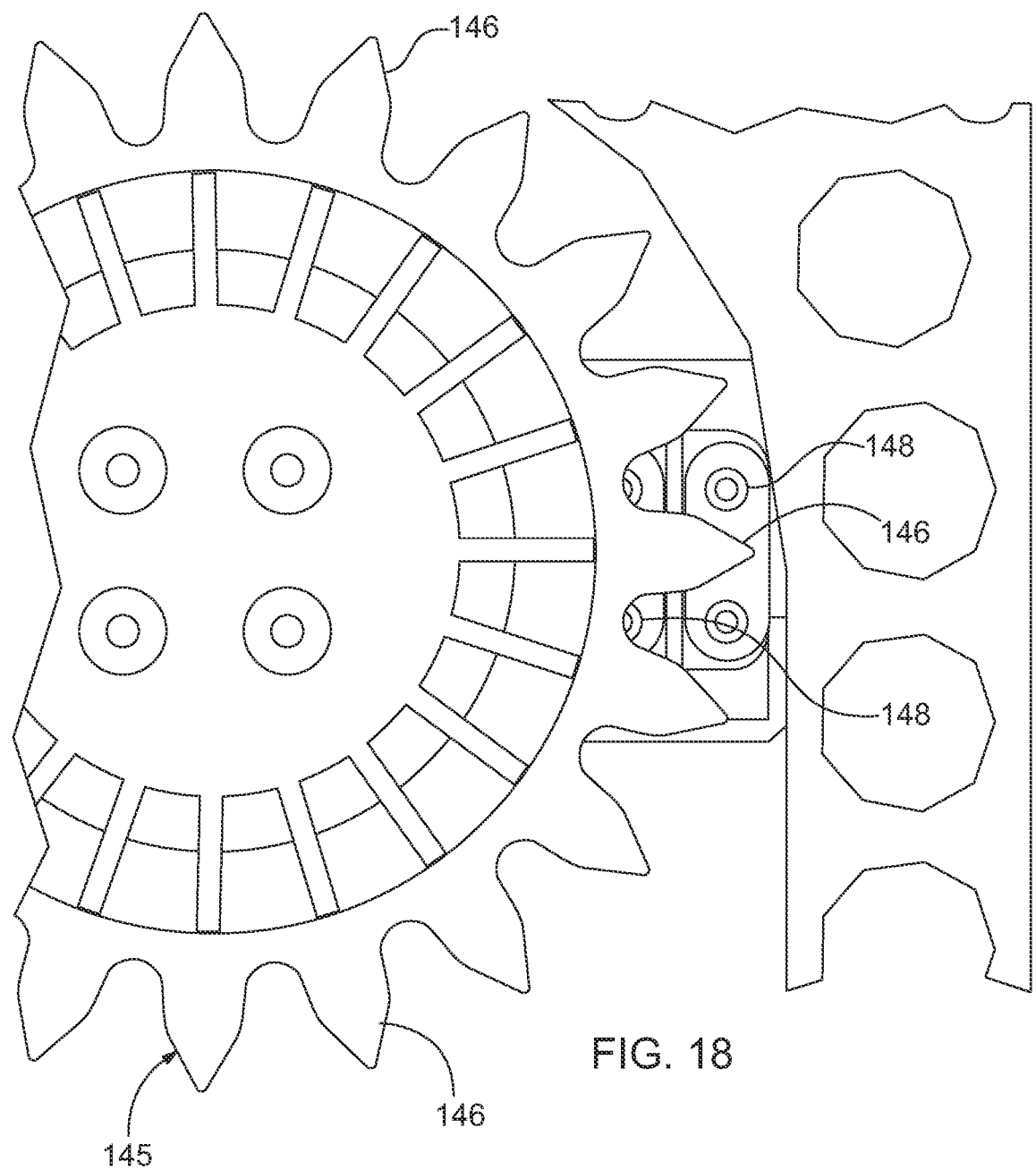
FIG. 18 is an enlarged fragmentary view of a vertical drive gear of the vehicle illustrated in FIGS. 3-5.

The optional door 230 may be any of a variety of elements for covering the pick opening. One example is shown in FIGS. 6A, 8 and 17, which includes a plurality of door segments 232 connected by a series of pivotable connectors, such as hinges 234. The pick station may include a mechanism for automatically driving the doors 230 between the open position and the closed position.

As shown in FIG. 17, a door closer 240 in the form of a belt 244 driven by a drive shaft 246 may drive the door between the open position and the closed position. The hinges 234 of the door segment may be attached to a plurality of hinge blocks 242 that slide within a groove. A connector 242, such as a bracket or block, may interconnect one or more of the hinge blocks 234 with the drive belt 244 so that driving the hinge blocks in a first direction extends the door over the pick opening 216 and driving the hinge blocks in a second direction retracts the door from the pick opening.

Track

The pick station 205 may include a mechanism for raising the vehicle 100 at the pick station to present the tote 55 to an operator working at the pick station. For instance, the pick station may include an elevator that lifts the vehicle 100 after the vehicle enters the workstation 200. Such an elevator may be powered by a power source at the workstation. Alternatively, the vehicle 100 may provide the power source for lifting or raising the vehicle at the workstation 200. For example, the workstation 200 may include a track or guide element 250 and the vehicle 100 may include a climbing element for climbing the track. For instance, the vertical drive 140 of the vehicle 100 may cooperate with the track 250 so that the vehicle may move vertically upwardly and downwardly within the workstation 200.

Figure 10:
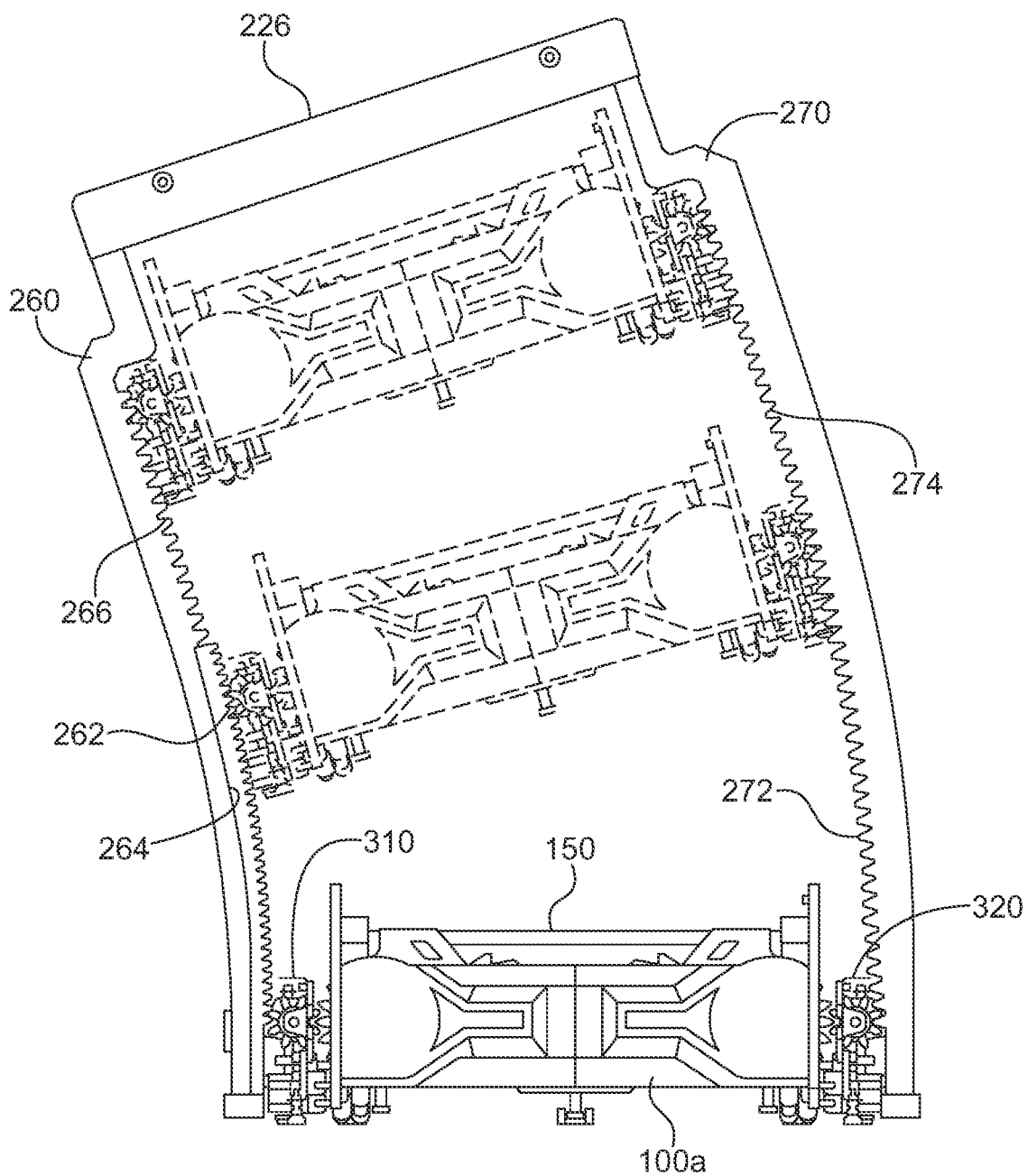
FIG. 10 is an elevational end view of the track illustrated in FIG. 9.
Figure 11:
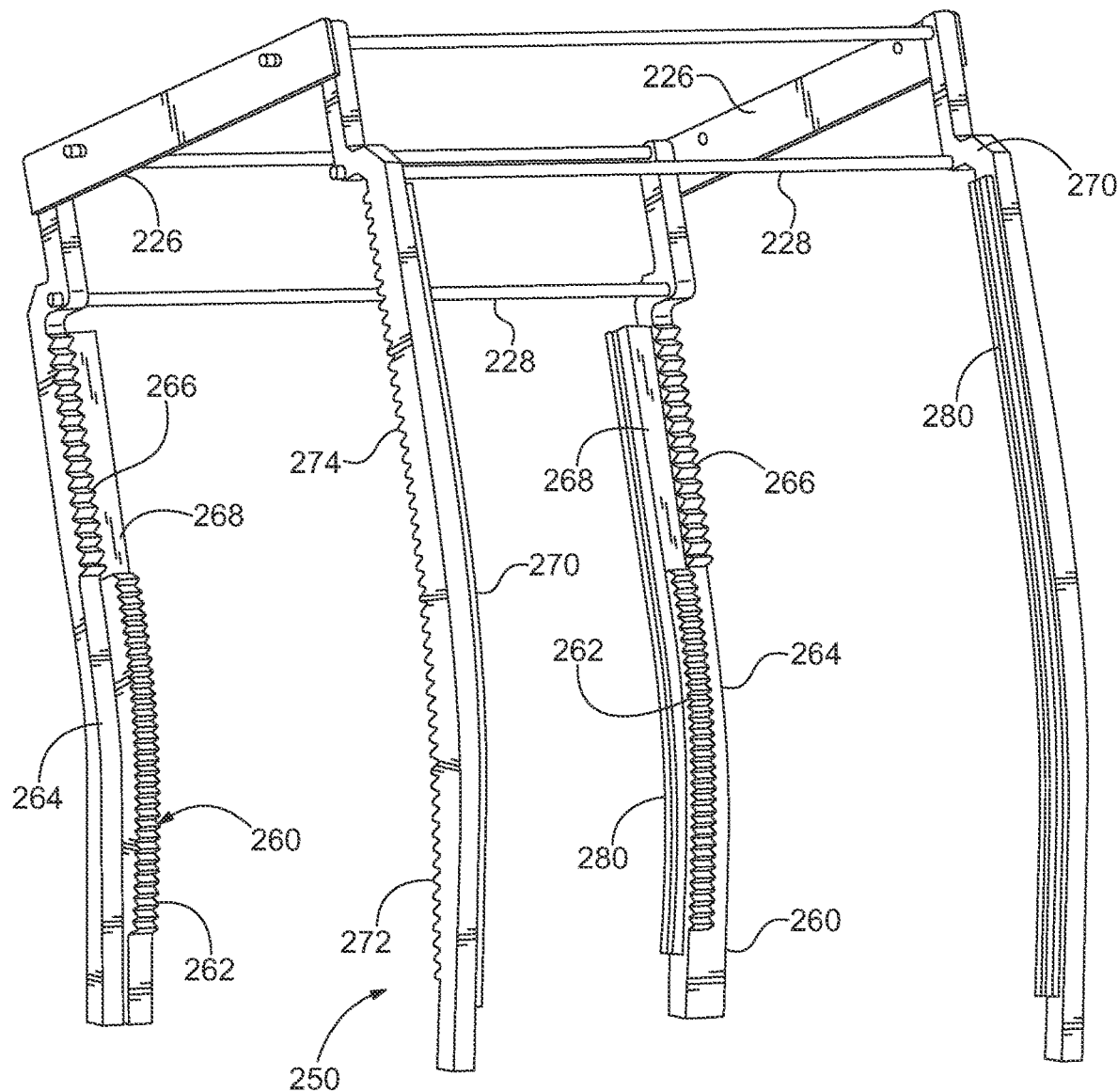
FIG. 11 is a rear perspective view of the track illustrated in FIG. 9.

In the present instance, the workstation 200 may be configured so that totes are tilted toward the operator when the tote is lifted toward the operator. For example, the workstation 200 may include an optional curved track 250 that curves toward the front of the workstation so that the tote 55 tilts toward the operator as the vehicle drives upwardly. Referring now to FIGS. 10 and 11, details of the optional curved track 250 will be described in greater detail. It should be understood that the features of the curved track are optional so that one or more of the features can be incorporated into the track while other features may be eliminated depending on the application.

Although the pick station is shown and described as having a housing that encloses a frame that includes the curved track 250, it should be understood that in some applications the curved track may provide the structural support for the pick station. And optionally, the housing may be modified or eliminated.

An exemplary embodiment of an optional track 250 is illustrated in FIGS. 10-11. The track 250 includes a pair of front tracks 260 spaced apart from one another and a pair of rear tracks 270 spaced apart from one another. The front and rear tracks 260, 270 form four corners of a vertical column that curves upwardly from back to front. The front and rear tracks may be rigidly connected. For instance, a pair of side bars 226 may connect the front tracks 260 to the rear tracks 270.

As shown in FIG. 10, each side bar 228 may extend at an angle relative to the horizon, angling upwardly from front to back to rigidly connect the top of one of the front tracks 260 with the top of the rear track 270 that is on the same side of the pick station. Additionally, a pair of cross bars 228 may extend across the width of the pick station to connect the front tracks 260 and the rear tracks. Specifically, a first cross bar 228 may extend between the two front tracks 260 to rigidly connect the front tracks and a second cross bar 228 may extend between the two rear tracks 270 to rigidly connect the rear tracks. In this way, the front tracks and the rear tracks may be connected to form a free-standing track.

If the track is curved as optionally shown in FIGS. 9-12 the length of the front track 220 is shorter than the length of the rear track 270. Therefore, the rearward end of the vehicle 100 that engages the rear track 270 moves faster than the forward end of the vehicle that engages the front track 260. To accommodate this difference in speed, the interface between the vehicle 100 and the track may be modified to account for the difference in relative velocity. For example, the front and rear tracks 260, 270 may each have a plurality of teeth that operate similar to the teeth on a gear rack. The pitch of the teeth of the front track may differ from the pitch of the teeth on the rear track. For instance, the front track may have a smaller tooth pitch, such as module sized M4 than the rear track, such as M6. In this way, if the vertical drive has vertical drive wheels that drive synchronously, the rear wheels travel a greater distance for each revolution of the vertical drive wheels than the front wheel.

Although the track 250 may optionally include a front track that has a different pitch than the rear track, it should be understood that alternative configurations may be incorporated to tilt the vehicle as it is raised at the pick station. For example, the vertical drive of the vehicle may be configured so that the vertical drive mechanism adjacent the rearward edge of the pick station is driven faster than the vertical drive mechanism adjacent the front of the pick station. In either configuration, the edge of the vehicle adjacent the rear edge of the pick station moves upwardly faster relative to the edge of the vehicle adjacent the front edge of the pick station.

As discussed above, the track and the vehicles may be configured to cooperate so that the rearward edge of the vehicle 100 adjacent the rear track 270 moves upwardly relative to the forward edge of the vehicle so that the vehicle is tilted toward the operator. In this way, totes are presented to the operator for improved access to items in the tote.

Referring to FIG. 10, the track 250 may optionally be configured so that the track has a first section that tilts the vehicle as the vehicle is moved upwardly and a second section that drives the vehicle upwardly at a constant angle relative to the horizon. In this way, the vehicle tilts as it moves upwardly to a predefined point at which the vehicle forms a predefined angle relative to the horizon. After this predefined point, the vehicle moves upwardly while maintaining the vehicle at the predefined angle relative to the horizon.

FIG. 10 illustrates a track 250 having a lower section configured to tilt the vehicle and an upper section configured to raise the vehicle at a constant angle relative to the horizon. For instance, the front track 260 may have a lower curved section 262 that follows a radius of curvature. Similarly, the rear track 272 may have a lower curved section 272 that follows a radius of curvature. The radius of curvature of the rear lower track 272 is larger than the radius of curvature of the front lower track 262. Additionally, the front track 260 includes an upper section 266 that extends substantially linearly from the end of the lower curved section 262. Similarly, the rear track 270 includes an upper section 274 that extends substantially linearly from the end of the lower curved section 272. Additionally, the upper section 266 of the front track may extend substantially parallel with the upper section 274 of the rear track.

As described above, the front and rear tracks 260, 270 may have lower sections that curve and upper sections that are linear. Additionally, the tooth pitch of the two curved lower sections 262, 273 are different to allow relative displacement of the front of the vehicle relative to the rear of the vehicle. However, the tooth pitch of the linear upper sections 266, 274 may be constant so that the front and rear of the vehicle move at a substantially constant rate so that the angle of the vehicle relative to the horizon is substantially constant.

Since the tooth pitch of the lower sections is different but the tooth pitch of the upper sections is the same, one of the tracks has different tooth pitch on the curved section than on the linear section. In the present example, the front track has a curved lower section that has a first tooth pitch, such as M4, and a linear upper section 268 having second tooth pitch, such as M6. Optionally, the upper and lower sections are offset. Specifically, a lower groove 264 having a width may extend vertically alongside the lower curved section 262 so that the lower groove 264 is substantially coextensive with the lower curved section. The upper linear section 266 may have a width that is substantially the same as the width of the lower groove and the upper linear section may extend from the end of the lower groove 264. Additionally, an upper groove 268 having a width that is similar to the width of the lower curved track 262 may extend vertically alongside the upper linear track 266.

Carriage

As described above, the workstation 200 may include a track 250 that guides the vehicles so that the vehicles can climb vertically to present totes to the operator. The track 250 and the vehicles 100 may be configured so that the vehicles can directly engage the track to climb the track. Alternatively, as described below, the workstation 200 may include a carriage 300 that the vehicle rides on and which climbs the track to lift the vehicle toward the operator.

A variety of carriages can be used to lift the vehicle, including a single-piece carriage that extends across the width of the side of the workstation 200. Alternatively, as described below, the carriage may comprise multiple independent sections. The elevator provides an interface between a power source and the vehicle to raise the vehicle. For instance, the carriage may be connected with a power supply, such as a source of electricity that powers a motor to raise the vehicle. Alternatively, as described below, the carriage may provide a mechanism to utilize power from the vehicle to lift the vehicle. In the example below, the carriage provides transfer gearing to transfer driving force from the vehicle to a climbing mechanism that climbs the track 250 and tilts the vehicle.

The carriage 300 illustrated in FIGS. 7-10 and 12-16 includes a front carriage assembly 310 and a rear carriage assembly 320. The front and rear carriage assemblies 310, 320 are substantially similar, however one of the two assemblies may include a charging assembly. As discussed below, the rear carriage assembly 320 is illustrated as incorporating the charging assembly. In the following description, the rear carriage 320 will be described in detail. It should be understood that the front carriage 310 includes features similar to those described below for the rear carriage except for the details regarding the charging assembly.

Figure 7:
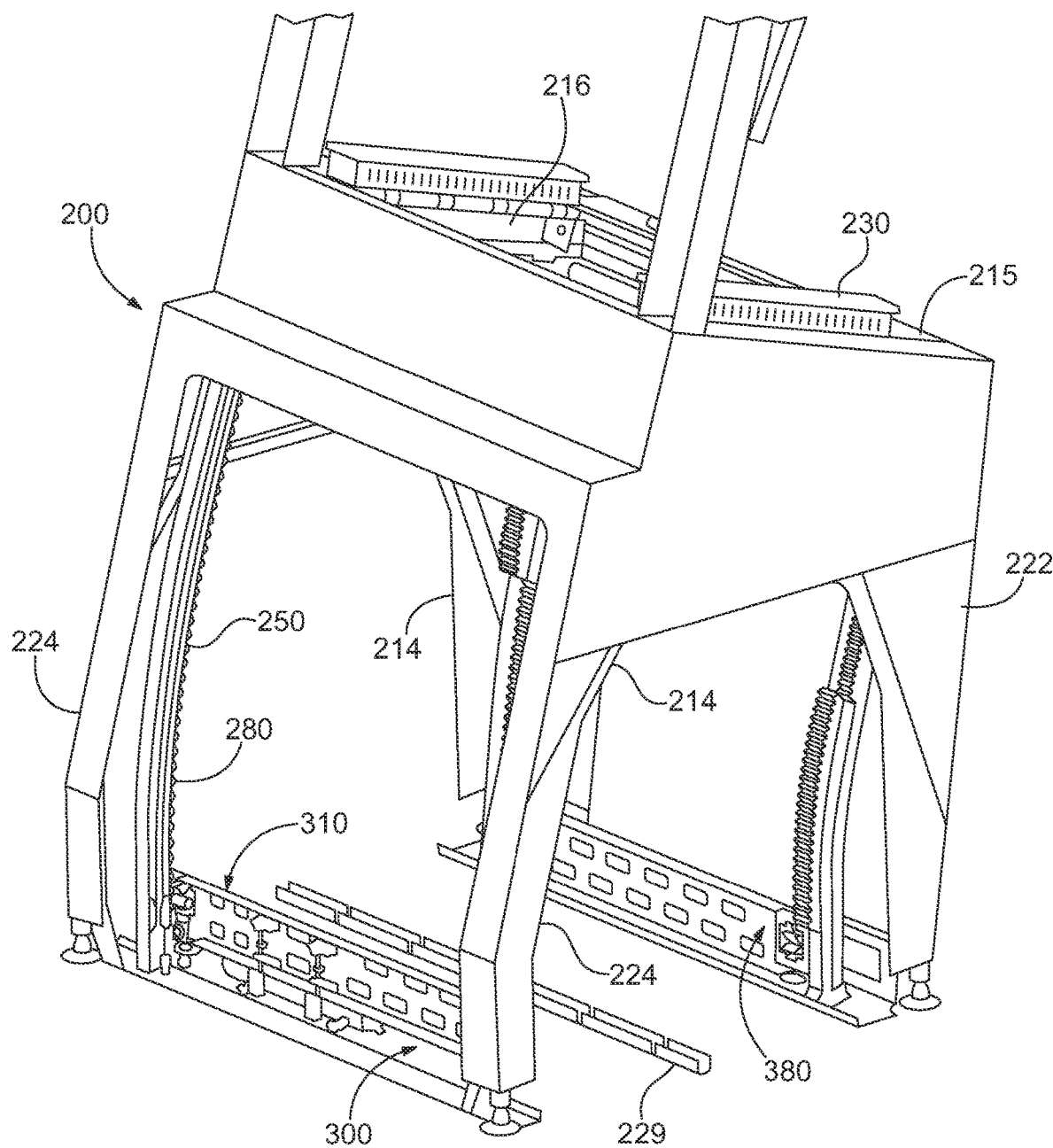
FIG. 7 is an enlarged fragmentary rear perspective view of the workstation illustrated in FIG. 6A.
Figure 9:
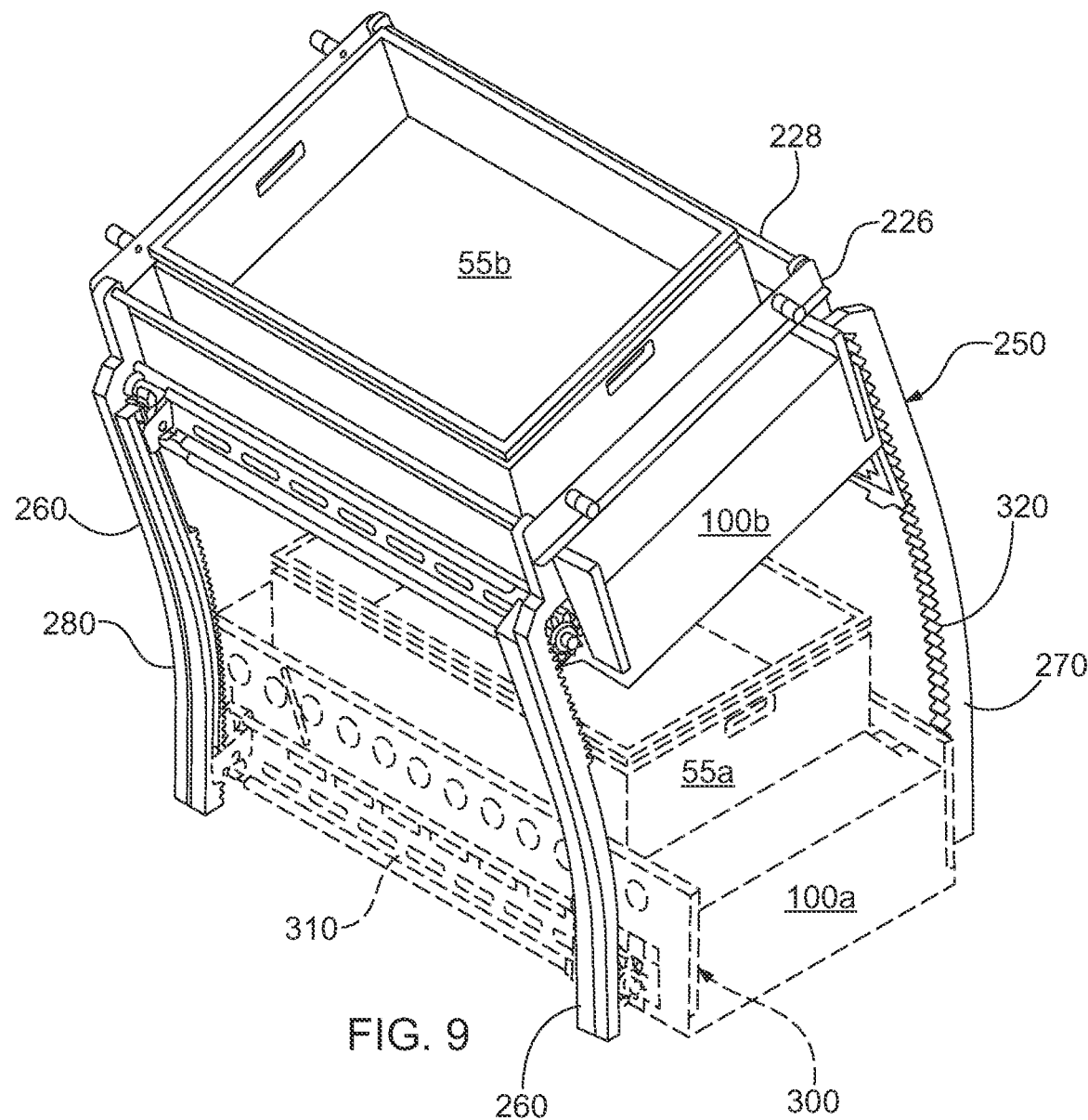
FIG. 9 is a perspective view partially broken away of the workstation illustrated in FIG. 6A, illustrating a track of the workstation.
Figure 13:
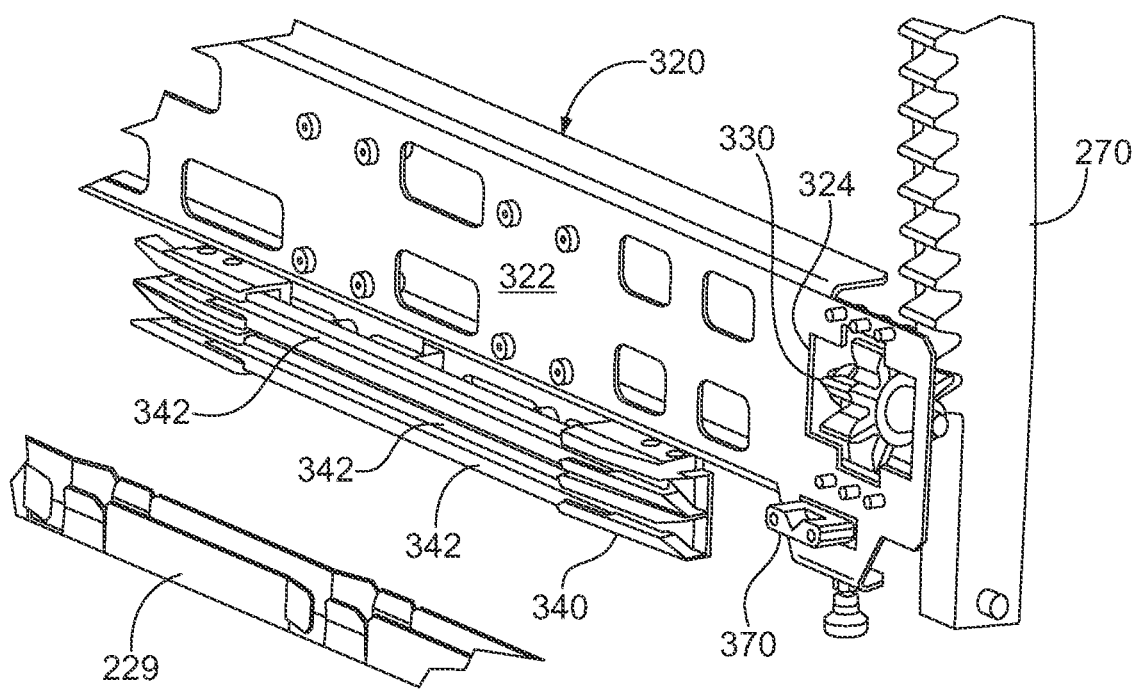
FIG. 13 is an enlarged fragmentary front perspective view partially broken away of the carriage illustrated in FIG. 12.

Referring now to FIGS. 7, 9 and 13, the rear carriage 320 comprises an elongated substantially vertical side wall having a length that extends between the two rear tracks 270. The side wall 322 may include a pair of apertures 324 spaced apart along the length of the wall. The first aperture may be adjacent the first rear track 270 and the second aperture may be adjacent the second rear track.

Figure 12:
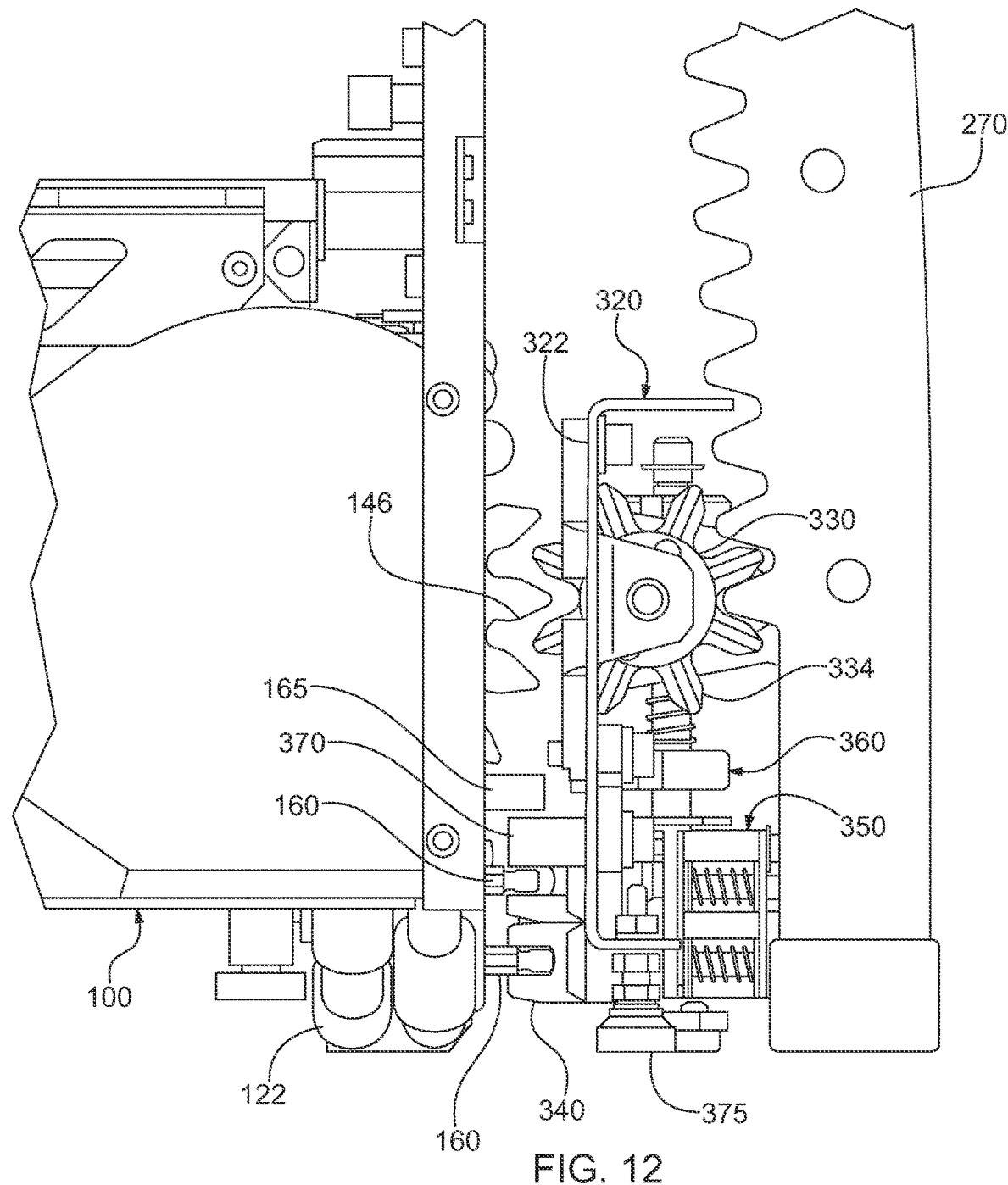
FIG. 12 is an enlarged elevational end view of the workstation illustrated in FIG. 9, illustrating a carriage of the workstation.

Optionally, the rear carriage assembly 320 may include a plurality of gears that cooperate with the vertical drive 140 of the vehicle to lift the vehicle at the pick station 200. For instance, the rear carriage 320 may include a first transfer gear 330 adjacent the first rear track 270 and a second transfer gear 330 adjacent the second rear track. As shown in FIGS. 12-13, the transfer gears 330 may extend through the windows 324 in the side wall 322.

The transfer gears 330 may be rotatably mounted on a shaft 339. The shaft 339 may be mounted on a yoke 338 that straddles the window 324 in the side wall so that a first end of the yoke is on one side of the window and a second end of the yoke is on the opposite side of the window.

Referring to FIG. 12, the transfer gears 330 operate as an idler gear between the vertical drive 140 of the vehicle and the track 250. Specifically, the transfer gear engages the drive gear 145 of the vertical drive 140 as well as the teeth of the rearward track section 270. In this way, the vertical drive gear 145 drives transfer gear 330, which drives the carriage vertically along the track 270. Driving the vertical drive gear 145 in a first direction drives the carriage upwardly along the track 270; driving the vertical drive gear 145 in a second direction drives the carriage downwardly along the track 270.

Optionally, the vehicle 200 may include structure for engaging the carriage 300 so that the carriage supports the weight of the vehicle. For instance, the vehicle may include a support element projecting generally horizontally. In FIG. 12, the support element is illustrated as a pin or post 165 and the vehicle may include a plurality of such support elements. Optionally, the vehicle may include a support element adjacent the four corners of the vehicle so that the front and back and both sides of the vehicle are supported.

The carriage may include structure to cooperate with the vertical support elements 165 on the vehicle 200. For instance, as shown in FIG. 13, the carriage subassembly 320 may include one or more blocks, stops, brackets or other element 370 having a surface to support the vertical support elements 165 of the vehicle. The support bracket 370 may have a horizontal surface to support the support pins 165. In the illustrated embodiment, the support bracket 370 includes a v-groove configured so that the support pin 165 nests within the v-groove.

The support elements 165 on the vehicle may be positioned so that the support elements are spaced above the support brackets 370 on the carriage 300 as shown in FIG. 12. In this way, a clearance gap is formed between the top of the support bracket and the bottom of the support elements 165. The clearance gap allows the support pins 165 to pass over the support brackets 370 when the vehicle drives into or through the pick station 200.

The support elements 165 on the vehicles cooperate with the support brackets 370 on the carriage to raise and lower the vehicle at the pick station. For instance, the vertical drive gear 145 of the vehicle may drive the transfer gear 330 of the carriage 300 to drive the carriage upwardly. As the carriage drives upwardly, the support brackets 370 engage the support pins 165 so that the support pins rest within the v-groove in the support bracket. As the carriage drives further upwardly, the support brackets 370 support the weight of the vehicle via the support pins so that the carriage lifts the vehicle upwardly. Similarly, when the carriage is lowered the support brackets 370 support the support pins so that the vehicle is lowered with the carriage.

Figure 15:
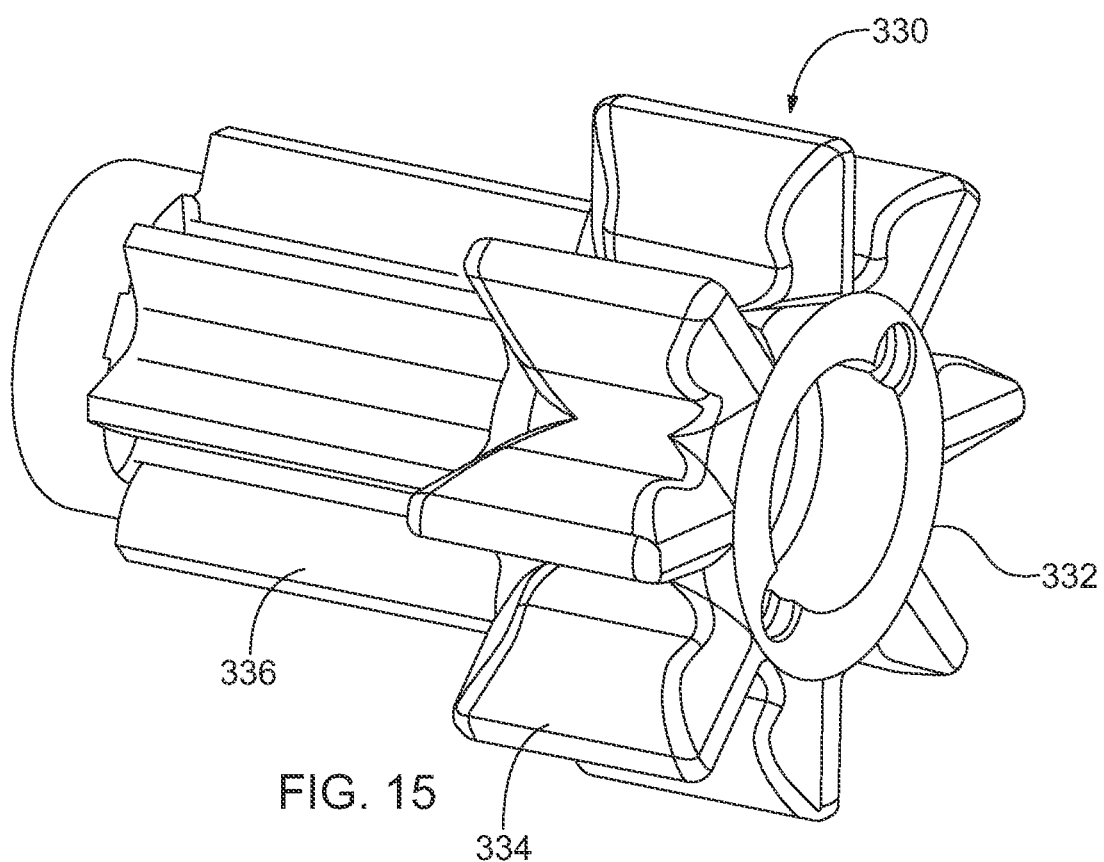
FIG. 15 is an enlarged perspective view of a gear of the carriage illustrated in FIG. 12.

As described above, the front carriage assembly 310 may be substantially similar to the rear carriage assembly 320. Additionally, as described above, the front track 260 may be configured differently than the rear track 270, such as in an application where the track 250 curves to tilt the tote 50 toward the operator at the pick station 200. Accordingly, it may be desirable to configure the transfer gear 330 for the front carriage 310 differently than the transfer gear for the rear carriage. For example, the transfer gear 330 for the rear carriage 320 may be an idler gear having a single set of gear teeth to cooperate with the rear track 270 and the front carriage may incorporate a compound gear 330' having two sets of gear teeth as illustrated in FIG. 15. However, it should be understood that if the front and rear carriages have different transfer gears, the track may be configured so that the rear carriage has a plurality of gear elements, such as the compound gear shown in FIG. 15.

Referring to FIG. 15, the optional compound transfer gear incorporated into the front carriage 310 is illustrated. The transfer gear 330' may include two separate coaxial gears having different tooth pitches that rotate at the same speed. However, in the present instance, the transfer gear 330' comprises a unitary piece with both gear elements fixedly connected with a central hub 332. For instance, the transfer gear may have a first gear 334 integrally formed with the central hub 332 that is configured to cooperate with a first portion of the front track 260 and a second gear 336 integrally formed with the central hub 332 that is configured to cooperate with a second portion of the front track. For instance, optionally, the first gear 334 is configured with a gear pitch designed to mesh with the upper portion 266 of the front track 260 and the second gear 336 is configured with a gear pitch designed to mesh with the lower portion 262 of the front track. Additionally, the transfer gear 330' may be configured so that the first gear 334 has gear teeth having a greater tooth length than the gear teeth of the second gear 336 so that the gear teeth of the second gear project outwardly from the central hub 332 farther than the gear teeth of the first gear.

The transfer gear 330' may be optionally mounted onto the front carriage 310 so that the first gear 334 aligns with and/or overlies the lower groove 264 of the front track. Additionally, the first gear may be configured so that the first gear does not mesh with or contact the lower rack section 262 of the front track 260. In this way, the first gear 334 is spaced apart from the lower rack section so that the first gear 334 does not engage the lower rack section.

Referring to FIGS. 11 and 15, the transfer gear 330' is configured and positioned so that the smaller diameter gear 336 engages the lower rack section 262 to drive the vehicle 100 upwardly. At the same time, the lower groove 264 provides clearance for the larger diameter first gear 334. As the vehicle climbs upwardly, the smaller gear 336 reaches the end of the lower track section 262. At the end of the lower track section, continued upward displacement of the vehicle causes the transfer gear to transition from the lower track section 262 to the upper track section 266. The transition occurs as the larger gear 334 engages the upper track section 264 and the upper groove 268 provides clearance for the smaller gear 336. When the first gear 334 engages the upper track section 266, continued driving of the transfer gear 330' drives the carriage upwardly along the upper track section.

Similarly, the upper and lower track sections cooperate with the transfer gear 330' to lower the carriage 300. Specifically, the first gear 334 engages the upper track section 266 until the first gear reaches the end of the upper track. Continuing to drive the transfer gear downwardly after the first gear reaches the end of the upper track causes the transfer gear to transition from the upper tracks to the lower track section so that the second gear 336 engages the lower track section while the lower groove 264 provides clearance for the first gear 334.

As discussed previously, the vertical drive 140 of the vehicle 100 may include a plurality of drive gears having teeth that project outwardly. Optionally, the spacing of the drive gears relative to one another may be fixed during operation of the vehicle when the vehicle is travelling along the ground and also when the vehicle is climbing in the racks. Similarly, the climbing gears may have a fixed spacing relationship when the vehicle is raised vertically at the workstation 200.

Accordingly, as shown in FIGS. 10 and 12, when the vehicle is in the workstation 200, the axis of rotation of the vertical drive gears 145 is parallel to the axis of rotation of the transfer gears 330 of the carriage. Therefore, when incorporating this optional combination of vertical drive elements and transfer gears, it is desirable to configure the teeth of the vertical drive gears 145 and the transfer gear to facilitate the teeth of the vertical gears passing through teeth of the transfer gear as the vehicle enters the workstation.

As shown in FIG. 12, the transfer gear 330 and the vertical drive gear 145 may be aligned so that the vertical drive gears do not impinge upon or contact the transfer gear when the vertical gear is translated relative to the transfer gear. For instance, the spacing between the teeth of gear 334 provides sufficient clearance for the teeth of the vertical drive gear 145 to pass between the gaps between the teeth of gear 334 when the vertical drive gear translates horizontally along a line that is parallel to the axis of rotation of the transfer gear 330. More specifically, the vertical drive gear and the transfer gear may be configured and positioned so that the addendum circle of the vertical drive gear 145 overlaps with the addendum circle of the transfer gear 330. While the addendum circles of the two gears overlap, the teeth of the gear are configured and oriented so that the vertical drive gear passes through the gaps between teeth in the transfer gear 330.

Referring again to FIG. 12, optionally, the vertical drive gear 145 and the transfer gear 330 may be configured and oriented to increase the clearance for the vertical drive gear to pass through the transfer gear when the vehicle drives into the workstation (i.e., when the vertical drive gear translates so that the axis of rotation of the vertical drive gear translates parallel to the axis of rotation of the transfer gear). Accordingly, the operating clearance of the vertical drive gear and the transfer gear is maximized when the carriage is at its lowest point as shown in FIG. 12.

As the carriage lifts the vehicle, the operating clearance between the vertical drive gear and the transfer gear may diminish so that the gear centers move toward a standard center distance. Specifically, the track 250 may be configured so that the distance between the front track and the rear track is not constant along the height of the track. For example, the reference line of the teeth of the front and rear tracks may be configured so that the distance between the two reference lines gradually reduces along the height of the track. The spacing between the reference lines of the tracks may continue to diminish along the entire height of the track. However, in the present instance the spacing of the track reference lines reduces to a predetermined distance and then remains constant for an upper portion of the tracks. By diminishing the distance between the reference lines of the front and rear tracks, the tracks move the transfer gears toward the vertical drive gears increasing the contact ratio between the vertical drive gear and the transfer gear.

As described above, when the vehicle enters the workstation, the vertical drive gear 145 and the transfer gear 330 are spaced apart at a maximum distance to maximize clearance to facilitate translation of the vertical drive gear relative to the transfer gear. Optionally, the track 250 may be configured so that the track guides the transfer gear toward the vertical drive gear as the carriage is driven up the track. In this way, the system is configured so that the operating clearance is reduced as the vehicle is driven upwardly along the track.

The carriage 300 may be a unitary item that interconnects both the front and rear carriage assemblies 310, 320. Alternatively, as shown in FIG. 10, the carriage may include separate front and rear carriages 310, 320 that operate independently. If the carriage 300 includes separate front and rear carriages it may be desirable to utilize a retainer to retain the transfer gear 330 in operative engagement with the track 250.

Figure 16:
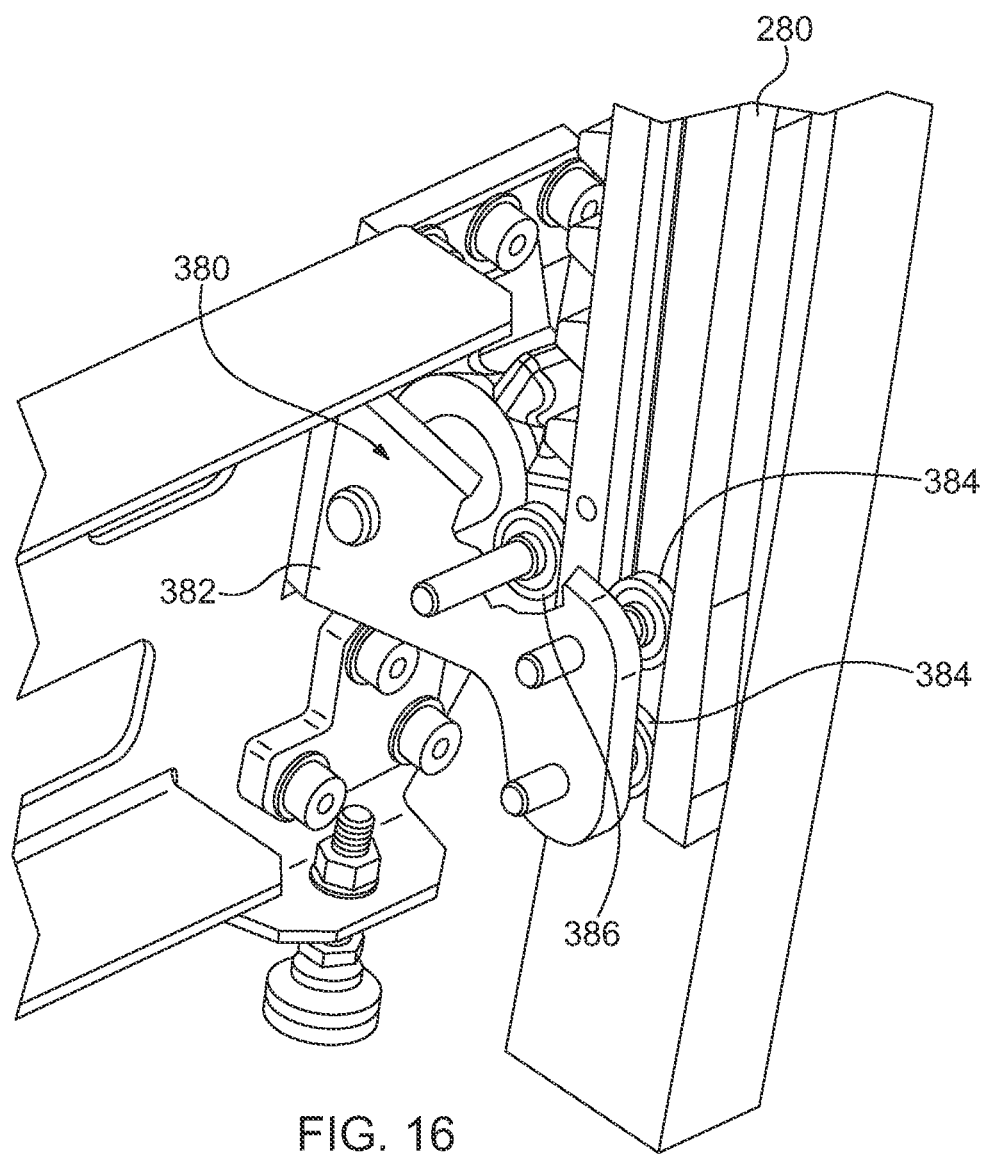
FIG. 16 is an enlarged fragmentary perspective view partially broken away of a guide for the carriage illustrated in FIG. 12.

Referring to FIGS. 11 and 16, the details of an optional retainer are illustrated. The retainer may include an element mounted on the workstation 200 that cooperates with an element mounted on each carriage 310, 320 to retain the transfer gear 330 in operative engagement with the track. In the present instance, a guide track 280 is mounted on the track 250. Specifically, the guide track 280 comprises an elongated channel or groove positioned adjacent each section of the track as shown in FIG. 11. Additionally, a follower assembly 380 may be connected with the carriage. It should be understood that the follower assembly may be connected to each end of both the front and rear carriages 310, 320. As shown in FIG. 16, the follower assembly 380 includes a bracket 382 connected with the rear carriage 320 and projecting transverse the sidewall 322 on the rear carriage. One or more inner following elements 384 are mounted onto a distal end of the bracket remote from the side wall of the rear carriage. The inner follower elements 384 are configured to cooperate with the groove of the guide track 280.

In the present instance, the inner follower elements 384 are roller bearings having a diameter corresponding with the width of the groove in the guide track 280. The follower assembly may also include an outer follower element 386 configured to cooperate with a second surface of the guide track 280. For instance, the follower 380 may include a third bearing 386 spaced apart from the inner bearing 384. The gap between the inner and outer bearings 384, 386 may be similar to the wall thickness of guide track 280 so that the inner bearing 384 follows the inner wall of the groove while the outer bearing 386 follows the outer wall of the guide.

Charging Assembly

The picking station 200 may optionally include a charging mechanism for charging the vehicle 100. The charging mechanism may be connected with an electrical power source 95 to provide a charging current to re-charge the power supply of the vehicles. For instance, optionally each vehicle includes an onboard rechargeable power source. The rechargeable power source may be a rechargeable battery. However, in the present instance, the vehicles comprise a power source that includes a plurality of ultracapacitors that can be rapidly re-charged. For example, the power source may include a plurality of supercapacitors or ultracapacitors sufficient to power the vehicle as it moves horizontally or vertically with a payload of 30-40 kilograms.

The charging mechanism may be any of a variety of elements for providing a charging current to the vehicle. For instance, in the present instance, the charging mechanism may be a charging rail 340 that cooperates with electrical contacts 160 on the vehicle 100.

As shown in FIG. 13, the charging rail 340 may comprise one or more elongated electrically conductive elements. The rail may form one or more channels or grooves configured to cooperate with electrical contacts of the vehicle. For instance, as shown in FIG. 12, the vehicle may include one or more charging contacts, such as brushes 160. The brushes 160 may project outwardly from the vehicle. The brushes 160 are oriented and configured to mate or cooperate with the charging rail 340. For example, as shown in FIG. 13 the charging rail may be horizontally oriented and the charging rails may project horizontally outwardly from the rear side of the vehicle so that the brushes project into electrical contact with the charging rail when the vehicle is in the carriage 300.

The charging rail 340 may be rigidly mounted to the track 250 or the housing 210 so that the charging rail does not move relative to the track 250 or the housing 210. Alternatively, the charging rail may be displaceable relative to the track or the housing 210. Optionally, the charging rail may be connected with the carriage so that the charging rail moves with the carriage. For instance, the charging rail may move vertically upwardly and downwardly as the carriage 300 moves vertically along the track 250. In this way, the charging contacts 165 of the vehicle 100 may remain in electrical connection with the carriage 300 as the carriage and the charging rail 340 are displaced vertically. In other words, the charging rail 340 may be configured to continue to provide a charging current to the vehicle 100 as the vehicle and the charging rail are displaced vertically at the pick station.

Optionally, the charging rail 340 may be horizontally displaceable relative to the vehicle 100 to horizontally align the charging contacts 165 of the vehicle with the charging rail.

In one embodiment, the charging rail 340 may be displaceably connected with the carriage 300 so that the charging rail 340 is displaceable horizontally toward and away from the vehicle. Optionally, the charging contacts of the vehicle may be displaceable horizontally and/or vertically relative to the charging rail 340.

A variety of connections may be incorporated to provide a displaceable connection between the carriage 300 and the charging rail 340. For instance, the connection may be a biased connection so that the charging rail is biased horizontally away from the sidewall 322 of the carriage 300 toward the vehicle.

Figure 14:
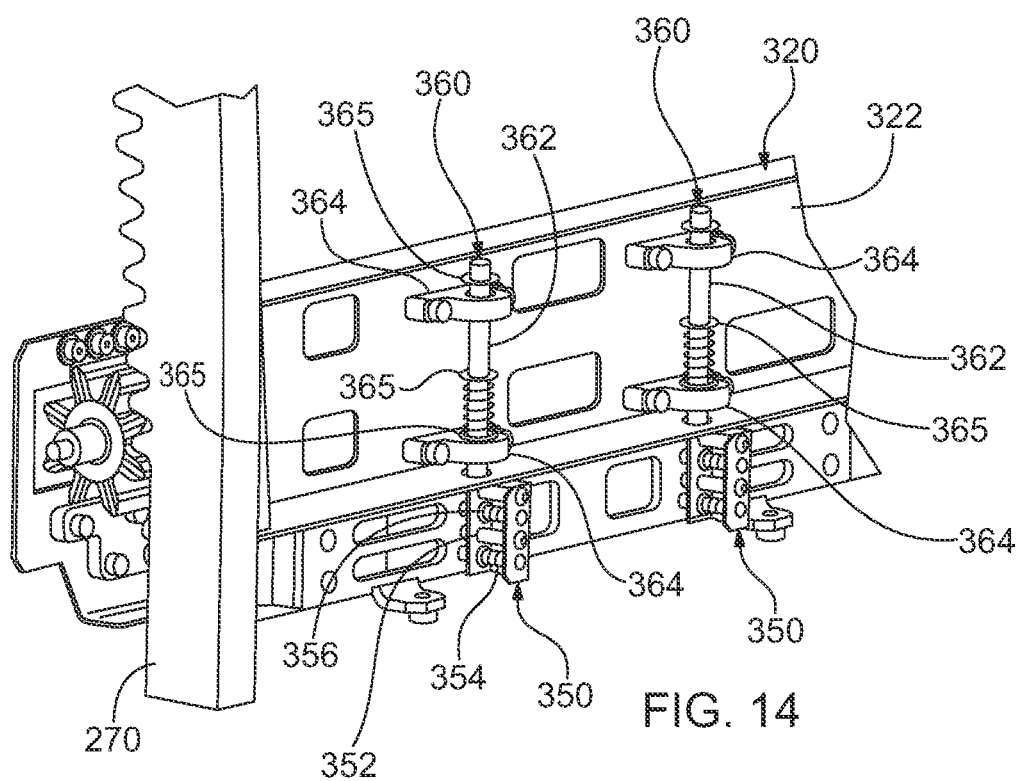
FIG. 14 is an enlarged fragmentary rear perspective view partially broken away of the carriage illustrated in FIG. 13.

An optional embodiment that includes a biased connection is illustrated in FIG. 14. In this embodiment, the carriage includes one or more lateral adjustment mechanisms 350 that bias the charging rail toward the vehicle 100.

The lateral adjustment mechanism 350 may include a plurality of horizontal rods 352 that are displaceable horizontally relative to a mounting bracket 356. Additionally, the lateral adjustment mechanism 350 may include one or more rigid rods that rigidly connect the bracket 356 with the carriage. One or more biasing elements 354 bias the displaceable rods 352 toward the vehicle. The biasing elements 354 may be any of a variety of elements, such as an elastomeric member or a spring. In the present instance, the biasing element is a coil compression spring circumscribing the displaceable rods 352.

Optionally, the charging rail 340 may be vertically displaceable relative to the vehicle 100 to vertically align the charging contacts 165 of the vehicle with the charging rail. For instance, the charging rail 340 may be displaceably connected with the carriage 300 so that the charging rail 340 is displaceable vertically relative to the vehicle.

A variety of connections may be incorporated to provide a vertically displaceable connection between the carriage 300 and the charging rail 340. In one embodiment, the connection may be a biased connection so that the charging rail is biased vertically relative to the sidewall 322 of the carriage 300.

An optional embodiment that includes a biased connection is illustrated in FIG. 14. In this embodiment, the carriage includes one or more vertical adjustment mechanisms 360 that bias the charging rail vertically relative to the vehicle 100. The vertical adjustment mechanism 360 may include a vertical rod 362 that is displaceable vertically and a biasing element for biasing the charging rail in a vertical direction. The vertical rod may be supported by one or more support elements. For instance, the vertical rod is supported between two support blocks 364, such as pillow blocks or mounting blocks.

Optionally, the vertical adjustment mechanism 360 may include one or more stops that limit the travel of the vertical rod relative to the support blocks 364. Although a variety of items can be used as such a stop, FIG. 14 shows one non-limiting example in which the stops are snap rings positioned along the length of the vertical rod.

One or more biasing elements 363 bias the vertical rod 362 vertically. The biasing elements 363 may be any of a variety of elements, such as an elastomeric member or a spring. In the present instance, the biasing element is a coil compression spring circumscribing the vertical rod 362.

The optional displaceable connection of the charging rail 340 allows the charging rail to displace relative to the vehicle as the vehicle enters the carriage. In one example, the charging rail is displaceable in a first direction to allow the charging rail to align with the electrical contact(s) of the vehicle. Similarly, and optionally, the charging rail is displaceable in a second direction transverse the first direction to allow the charging rail to align with the electrical contact(s) of the vehicle.

Additionally, the charging rail 340 may include one or more guides or deflectors, such as tapered fingers 345 that are engageable with the brushes 165 of the vehicle to align the brushes into the channels of the charging rail. Specifically, the guides 345 may include one or more tapered surfaces to deflect the charging rail vertically relative to the brush when the brush engages the guide.

In the foregoing example, the charging rail 340 may be vertically and/or horizontally displaceably connected to the carriage 300 so that the carriage is displaceable relative to the electrical contact(s) 165 of the vehicle. Alternatively, the charging rail 340 may be substantially rigidly connected relative to the carriage and the electrical contacts may be vertically and/or horizontally displaceable relative to the vehicle to align the electrical contacts with the charging rail when the vehicle enters the carriage.

Tote Retainer

As described above, the vehicles 100 deliver items, such as totes 55 to the workstation 200 and the vehicles are lifted vertically to raise the tote into a pick opening 216 so that an operator can remove an item from the tote. The vehicle then lowers back down toward the ground along with the tote. However, there may be applications in which it is desirable to retain the tote in a raised position when the vehicle lowers down. In this way, the tote can remain in the raised position at the pick station 205 while the vehicle 100 drives to a different location to perform a separate task, such as retrieving another tote 55. Accordingly, as shown in FIG. 17, the pick station 205 may include an optional retainer mechanism 290 for retaining the tote in the raised position.

The retainer mechanism 290 includes a mechanical element displaceable between a retracted position and an extended position. In the extended position, the retainer projects inwardly toward the tote. As shown in FIG. 9, the totes may have an upper lip or flange. In the extended position, the retainer mechanism 290 projects toward the tote so that the retainer mechanism extends under the lip of the tote. In this way, the retainer operates as a stop impeding downward movement of the tote if the vehicle moves downwardly.

The retainer mechanism 290 can include any of a variety of elements for engaging the totes. FIG. 17 illustrates one exemplary mechanism. Specifically, the retainer mechanism may include a pivotable finger or arm 292, referred to as a paddle. The paddle 292 is a longitudinally elongated element that pivots around a pivot axis located adjacent a first end of the paddle. The second end of the paddle 292 pivots between a retracted position and an extended position. In the retracted position the paddle is retracted away from the picking window 216 so that the tote can readily move up and down as the vehicle moves up and down on the track 250. In the extended position, the paddle extends into the pick window 216 so that the paddle engages the tote to prevent the tote from moving downwardly.

The retainer mechanism 290 includes a drive element for driving the retainer mechanism between the retracted position and the extended position. The drive element may be a separate drive mechanism, such as a solenoid, motor, or other actuator. Optionally, as shown in FIG. 17, the drive mechanism for the door 230 covering the pick window 216 also drives the retainer mechanism. Specifically, a connector 294 connected with the door drive 240 is also connected with a linkage 296 connected with the paddle 292. In this way, actuating the door drive mechanism also actuates the retainer mechanism 290. Additionally, it may be desirable to bias the retainer mechanism into either the extended or the retracted position. In the present instance, a biasing element, such as a spring, biases the paddle toward the retracted position.

Optionally, the connection between the door drive 240 and the paddle 292 is configured so that actuating the door drive from a closed position to an open position drives the paddle from retracted position to the extended position. Additionally, the door drive 240 and the paddle 292 may be connected so that actuating the door drive from an open position to a closed position drives the paddle from the extended position to the retracted position.

Operation

The system 10 and the various subassemblies described above may be configured to facilitate numerous methods of operations related to material handling as described below.

The system 10 may include a plurality of autonomous vehicles 100 for delivering items to workstations 200. The vehicles may be configured to drive along a horizontal pathway 60, such as driving along the ground. Optionally, the vehicles may drive along the ground to a storage area where a plurality of items are stored. For instance, a plurality of items may be stored in a plurality of containers, such as totes. Optionally, the totes may be stored in a plurality of racks 20 that are spaced apart forming longitudinally elongated aisles 50. The aisles may be parallel with one another.

The vehicles 100 may drive under one of the racks 20 in a direction parallel to one of the aisles 50. The vehicle 100 may drive under the rack until the vehicle reaches a destination column 22 in the rack, which is the column in which an item is to be stored or from which an item is to be retrieved. Optionally, when the vehicle arrives at the destination column the vehicle may rotate or turn to change the direction of travel. For instance, while the vehicle is in the destination column, the vehicle may change from a direction of travel parallel to the aisle to a direction of travel transverse the aisle. Alternatively, the vehicle may drive under the rack 20 to the destination column along a path that is substantially perpendicular to the aisle. After reaching the destination column, the vehicle optionally drives perpendicular to the aisle into the aisle of the destination column.

In the aisle, the vehicle optionally drives upwardly to the destination location 25 where the item is to be stored or from which the item is to be retrieved. The vehicle may be raised up the column by an elevator or other mechanism. However, in the present instance, the vehicle includes a vertical drive mechanism 140 operable to drive the vehicle upwardly. Additionally, the system may include a track or guide 40 positioned adjacent the column and the vertical drive of the vehicle may engage the track or guide to drive the vehicle up the column to the destination location.

Once the vehicle is raised to the destination location, an item, such as a tote 55, may be transferred between the vehicle and the destination location. For instance, the vehicle may include a transfer mechanism for transferring totes and the vehicle may actuate the transfer mechanism to transfer a tote from the vehicle to the destination location or to transfer a tote from the destination location to the vehicle.

After transferring an item between the vehicle and the destination location, the vehicle optionally drives downwardly to a horizontal path, such as the ground. The vehicle may then drive horizontally along a path that is perpendicular to the aisle.

The system may also include one or more workstations 200. The system may include a method for operating an autonomous vehicle at a workstation 200. For instance, the vehicle 100 may travel along a horizontal path carrying an item, such as a tote 55, to the workstation 200. The vehicle may drive into the workstation to align the vehicle with a pre-determined location within the workstation. Alternatively, the vehicle may drive through the workstation to another workstation. For instance, the workstation may include a plurality of locations referred to as pick locations. The vehicle may drive through the workstation to move from a first pick station 205 to a second pick station. Alternatively, the vehicle may drive into the workstation, drive through the workstation, and then exit the workstation to move to a different workstation where the vehicle will present an item for removal.

The system may optionally include a method for controlling the vehicle to present items, such as totes, at the workstation 200. For instance, the method may include the step of driving the vehicle 100 into the workstation 200 and raising the vehicle upwardly. For instance, the vehicle may be raised upwardly toward an operator. Optionally, the workstation may include an opening in an upper surface and the method may include the step of raising the vehicle so that a tote on the vehicle is positioned within the opening. Additionally, the opening may be configured to correspond with the interior configuration of the tote. Further, the step of raising the vehicle may include the step of raising the tote until an upper edge of the tote is adjacent the underside of the upper surface and the interior of the tote is aligned with the opening. Further still, the step of aligning the tote may include positioning the tote so that the interior of the tote substantially spans the opening to enclose the opening to impede items passing through the opening and outside the tote.

The method of controlling the vehicle to present items may optionally include the step of tilting the totes as the totes are raised. For instance, the method may include the step of raising the vehicles vertically upwardly and gradually displacing the vehicle relative to the horizon so that a first edge of the vehicle is raised relative to a second edge of the vehicle. Optionally, the step of raising the vehicle vertically upwardly may include the step of tilting the vehicle until the vehicle is tilted to a predetermined angle relative to the horizon and then raising the vehicle vertically upwardly at the predetermined angle. Optionally, the system may selectively control the distance that the vehicle is raised vertically at a predetermined angle depending on a characteristic of the item that the vehicle is carrying. Specifically, if the item is a first height, the vehicle may travel at a predetermined angle for a first distance. If the item is a second height, the vehicle may travel at a predetermined angle for a second distance that is greater than the first distance.

The predetermined angle to which the vehicles are raised may correspond to the angle of the upper surface of the workstation so that the vehicle is tilted to an angle substantially parallel with the opening in the upper surface. Additionally, the system may be configured to accommodate totes or containers of varying height at the workstation. For instance, the vehicle may be raised and tilted to the predetermined height and then raised at the predetermined angle for a first distance for a tote having a first height. Similarly, the vehicle may be raised at the predetermined angle for a second distance for a tote having a second height. Preferably, in both instances the vehicles are raised so that an upper edge of the tote is adjacent the upper surface of the workstation.

Optionally, the steps of raising and tilting the vehicle 100 may include the step of driving the vehicle up a track 250. The track may include a pair of spaced apart curved forward track segments and a pair of spaced apart curved rear track segments. The method may include the step of driving the rearward edge of the vehicle at a higher speed to raise the rearward edge of the vehicle relative to the forward edge of the vehicle to tilt the vehicle to a predetermined angle. After tilting the vehicle to the predetermined angle, the method may include the step of driving the rearward edge of the vehicle along the rearward track at a speed substantially similar to the forward edge of the vehicle along the forward track. Additionally, the step of driving the vehicle up the track may include the step of driving the front edge of the vehicle up a first section of the front tracks having a first gear tooth pitch and driving the vehicle up a second section of the front tracks having a second gear tooth pitch.

Optionally, the step of driving the vehicle 100 up a track 250 may include the step of rotating vertical drive gears 145 of the vehicle about axes that are transverse the axes of rotation of a plurality of drive elements that drive the vehicle along a horizontal surface. The step of driving the vehicle up the track may optionally include the step of driving the vertical drive gears in a first direction to drive a transfer gear 330 that meshes with the track 250. Driving the vertical gears in a first direction drives the transfer gear up the track. The transfer gear may have a first gear element having a first gear pitch and a second gear element having a second gear pitch. The method may include the step of driving the vertical drive gears 145 to drive the first gear element up a first section of the track and continuing to drive the vertical drive gears 145 to drive the second gear element up a second section of the track.

The system may optionally include a method for charging autonomous material handling vehicles. The method may include the step of driving a vehicle 100 into a workstation 200 to deliver an item. The vehicle may include an electrical contact 160 and the workstation may include a charging element 340 for providing a charging current. The method may include the step of electrically connecting the electrical contact 160 of the vehicle with the charging element 340. For instance, the step of connecting may include the step of biasing the charging element toward the charging contact and/or the step of biasing the charging contact toward the charging element.

Additionally, the method of connecting may include the step of driving the vehicle toward the charging element to drive the electrical contact 160 into electrical connection with the charging element 340. Optionally, the method includes the step of automatically adjusting the height of the charging element 340 relative to the charging contact 160 as the charging contact is displaced into electrical engagement with the charging element. Additionally, the method may include the step of automatically adjusting the lateral positioning of the charging contact relative to the charging element as the charging contact is displaced into electrical engagement with the charging element.

The method of charging the vehicle may optionally include the step of raising the vehicle vertically while continuing to charge the vehicle. For instance, the method may include the step of maintaining electrical engagement between an electrical contact 160 of the vehicle with a charging element 340 while the vehicle is displaced upwardly. Further, a charging current may be continuously provided to the charging element as the vehicle is displaced upwardly at the workstation 200. Additionally, the charging current to the charging element may be maintained as the vehicle remains at a pick station 205 of the workstation 200 so that a charging current may be supplied to the vehicle while an operator transfers items to or from the vehicle. The charging current may also be supplied to the vehicle while the vehicle is lowered downwardly. The method may optionally include the step of disengaging the vehicle from the charging element 340 by driving the vehicle away from the charging element.

The system optionally includes a method for delivering and retaining a container at a workstation 200. For instance, the method may include the step of driving a vehicle carrying a container such as a tote to a workstation and raising the vehicle to raise the container at the workstation. While the tote is raised at a predetermined height at the workstation, a retainer may retain the tote at the predetermined height while the vehicle moves away from the workstation. For instance, the tote may be retained at the predetermined height while the vehicle is lowered downwardly and then driven along a horizontal path away from the workstation. While the tote is retained after the vehicle is displaced away from the tote, the method may optionally include the step of selectively accumulating a plurality of items into the tote.

Optionally, the items accumulated in the tote may be delivered by one or more separate vehicles. For instance, the workstation 200 may include a plurality of adjacent pick stations 205 and each pick station may be configured to receive vehicles to deliver items to the workstation. The tote 55 may be retained in a raised position by a retainer 290 at a first pick station 205 of the workstation. While the tote is retained at the first pick station, a vehicle may deliver an item to a second pick station. The operator may remove an item from the vehicle at the second pick station and place the item into the tote at the first station. The process of vehicles delivering items to the second pick station to provide items to be placed into the tote at the first pick station may continue until a predetermined set of items are placed into the tote at the first pick station.

Once the predetermined set of items has been accumulated in the tote at the first pick station, the tote may be removed from the first pick station. Optionally, the tote may be removed by driving a vehicle into the workstation and raising the vehicle upwardly toward the tote. The retainer may then be disengaged from the tote to release the tote. The vehicle may then be displaced downwardly along with the tote. The vehicle may then be driven away from the workstation to drive the tote of accumulated items away from the workstation 200. It should be understood that the vehicle that retrieves the tote from the first pick station may be different from the vehicle that delivers the tote to the first pick station.

Similarly, rather than accumulating items in the tote retained at the pick station, the method may include the step of removing items from the retained tote and feeding the items to a plurality of totes at one or more separate pick stations. For instance, the tote retained at the first pick station may contain a plurality of items. At one or more adjacent pick stations, a plurality of vehicles may deliver a plurality of totes to the adjacent pick station(s). As each tote is delivered, the operator may remove one or more of the items from the tote at the first pick station and transfer the item(s) to the totes delivered to the adjacent pick station(s). In this way, the tote delivered to the first pick station can provide a supply of items to be transferred to one or more totes delivered to one or more adjacent pick stations. After items are transferred from the tote retained at the first pick station, the method may include the step of raising a vehicle in the first pick station and releasing the retainer to release the tote. The vehicle may then be lowered downwardly along with the tote and the vehicle may be driven away from the workstation along with the tote. It should be understood that the vehicle that retrieves the tote from the first pick station may be different from the vehicle that delivers the tote to the first pick station.

Optionally, the system may also include a method for selectively enclosing an opening 216 in an upper surface 215 of the workstation 200. A covering such as a door 230 may be displaced over the opening 216 of the workstation 200 to impede items passing through the opening. While the covering overlies the opening, a vehicle carrying a tote may be raised so the top edge of the tote is at a determined height adjacent the upper surface 215. Once the tote is at the predetermined height, the cover may be removed from the opening to provide access to the tote through the opening. In response to a signal that the transfer of items to or from the tote has been completed, a central controller 90 may control operation of the doors to displace the covering over the opening. For instance, the controller may actuate a drive mechanism to close the doors 230 over the opening 216. Additionally, the central controller may control the operation of the vehicle to retain the vehicle in a raised position to maintain the tote at the predetermined height until the doors are closed over the pick opening. After the doors are closed, the central controller may provide signals to the system to lower the vehicle along with the tote and then move the vehicle away. For instance, the central controller may provide signals to the vehicle to drive the vehicle downwardly to lower the vehicle.

The system may optionally provide a method for adjusting the vertical drive 140 relative to the workstation 200 to provide clearance between the vertical drive and the workstation as the vehicle drives into the workstation. The vehicle may be driven into the workstation so that the teeth of vertical drive gears pass through the teeth of an element that cooperates with the vertical drive gears to drive the vehicle upwardly. Driving the vertical drive gears in a first direction drives the vehicle upwardly in the workstation. Driving the vertical drive gears in a second direction drives the vehicle downwardly.

To prevent the vertical drive gears from impacting the workstation when the vehicle is driven into the workstation, the position of one or more teeth of each vertical drive gear may be monitored to ensure the teeth are at a predetermined location relative to the workstation. Specifically, the method may include the step of monitoring the circumferential location of a predetermined tooth of each vertical drive gear 145. The vehicle may enter the workstation and drive upwardly and then downwardly. After the vehicle is driven downwardly to the ground, the position of the predetermined tooth of each vertical drive gear may be measured relative to the workstation. For instance, the workstation may include a gear that meshes with each vertical drive gear. Optionally, such gear may be the transfer gear 330. After the vehicle is lowered to the ground, the position of the predetermined tooth of each vertical drive gear may be detected to determine whether the tooth is within a predetermined circumferential range. The circumferential range may be determined relative to the tooth spacing of the gear that meshes with the vertical drive gear to ensure that the vertical drive gears do not impact the meshed gear when the vehicle is driven parallel to the axis of rotation of the meshed gear.

The system may also include a method for projecting information onto the workstation 200 to aid the operator in handling items. For instance, a container such as tote 55 may be displaced into an opening 216 in the workstation 200. A surface may be provided adjacent the opening 216. For instance, the surface may frame all or part of the opening. In the example illustrated in FIG. 19, the surface 215 optionally surrounds the entire opening 216.

A projector 220 may be controlled to provide one or more projections onto the workstation to provide information to assist the operator. For example, the projector may provide a first light signal to provide a signal to the operator indicative of the item to be retrieved. For instance, the first light may illuminate items in the tote that are to be retrieved. The tote 55 may include a plurality of dividers that divide the tote into a plurality of separate storage locations, referred to as cells 56. The projector may direct the first light 400 onto a particular cell 56 so that the cell is illuminated while the remaining cells are not illuminated as shown in FIG. 19. In this way, the first light signal may identify the location of the item to be retrieved.

The projector 220 may optionally provide a second light to provide information to the operator regarding the item to be retrieved. As shown in FIG. 19, the second light signal 405 may be projected onto the surface 215 of the workstation 200 adjacent the opening 216 in the workstation. Optionally, the second light signal may be projected onto the surface adjacent the location that the items are housed within the tote. For instance, as shown in FIG. 19, the second light signal 405 may be projected onto the surface 215 adjacent the first light signal 400.

The second light signal may provide any of a variety of information to aid the operator to retrieve the item or items. For instance, as shown in FIG. 19, the second light signal may identify the number of items to be retrieved from the tote.

The method may also include the step of projecting a third light signal to provide further information to the operator regarding the item to be retrieved. Depending on the configuration of the surface 215 and the configuration of the second and third light signals, the third light signal 410 may be projected onto the surface 215 adjacent the first light signal and/or adjacent the second light signal 405. The third light signal may be configured to provide information separate from the information provided by the second light signal 405. For instance, as shown in FIG. 19, the third light signal may provide an icon or graphical/pictorial representation of the item to be retrieved.

As described above, the projector may be configured to project a plurality of signals onto the items in the tote 55 or the work surface 215 adjacent the tote. It should be understood that the projected visual signals may vary in number and in configuration. For instance, FIG. 19 illustrates an embodiment in which three different types of light signals are provided, a first that identifies the location of the item, a second that identifies the quantity of items to be retrieved and a third that identifies the item to be retrieved. However, in some applications different information may be provided or only one or two of the light signals may be utilized. Similarly, additional light signals may be projected onto the tote 55 or the surface 215 of the workstation 200 adjacent the tote.

In this way, the system may provide a method of processing items that includes the step of retrieving a container of item and transferring the items to a workstation 200. The method may include the step of projecting a first light signal onto a portion of the container to identify the location from which the item is to be retrieved from the container. The method may include the step of simultaneously projecting a second light signal onto a surface 215 of the workstation that identifies the number of items to be retrieved from the identified location within the container. Optionally, the method may include the step of projecting a third light signal onto a surface 215 of the workstation 200 that identifies the item to be retrieved. The third light signal may be provided instead of the second light signal or it may be provided simultaneously with the second light signal.

The method may also include the step of actuating an actuator to indicate that the appropriate items have been retrieved from the container. The actuator may be any of a variety of actuators, such as a button or a touch screen display. In response to actuating the actuator, the container may be displaced away from the workstation. For instance, the container may be displaced away from the workstation by one of the vehicles 100.

It should therefore be understood that this invention is not limited to the particular embodiments described herein but is intended to include all changes and modifications that are within the scope and spirit of the invention as set forth in the claims.

What is claimed is:

1. A material handling system for sorting, storing, or retrieving a plurality of items, comprising:
 a plurality of delivery vehicles, each vehicle comprising:
  a surface configured to support an item to be delivered by the vehicle;
  a transfer mechanism configured to transfer the item between the vehicle and a delivery location;
  a first drive system configured to drive the vehicle along a horizontal surface, wherein the first drive system comprises one or more rotatable elements;
  a second drive system configured to drive the vehicle vertically, wherein the second drive system comprises one or more rotatable elements;
  a rechargeable power source electrically connected with the first and second drive systems and configured to power the first and second drive systems;
  a first charging element electrically connected with the rechargeable power source;
 a second charging element configured to releasably connect with the first charging element and electrically connected with an electrical power source operable to recharge the rechargeable power source of the vehicles;
 wherein one of the first charging element and the second charging element comprise:
  a first displaceable mount configured to facilitate movement of the first or second charging element in a vertical direction; and
  a second displaceable mount configured to facilitate movement of the first or second charging element in a horizontal direction.

2. The system of claim 1 wherein the one of the first charging element and the second charging element is the second charging element so that the second charging element is displaceable relative to the vehicle.

3. The system of claim 2 wherein the rotatable elements of the second drive system comprises a plurality of engagement elements configured to engage a vertical track.

4. The system of claim 3 wherein the engagement elements comprise gear teeth.

5. The system of claim 2 wherein the first displaceable mount comprises a first biasing element biasing the second charging element in a vertical direction.

6. The system of claim 5 wherein the first displaceable mount comprises a second biasing element biasing the second charging element in a horizontal direction.

7. The system of claim 6 wherein the second charging element comprises a horizontally elongated charge rail.

8. The system of claim 7 wherein the charging rail comprises a first guide configured to displace the charge rail relative to the first charging element upon contact between the first charging element and the charge rail.

9. The system of claim 8 wherein the first charging element comprises a second guide configured to displace the first charging element relative to the charge rail upon contact between the first charging element and the charge rail.

10. The method of claim 7 wherein the second charging element is a charging rail comprising having a first guide configured to displace the charge rail relative to the first charging element wherein the step of controlling movement of the one vehicle to displace a first charging element of the one vehicle into engagement with the second charging element comprises displacing the charging rail upon engagement between the first guide and the first charging element.

11. The method of claim 10 wherein the first charging element has a second guide configured to displace the first charging element relative to the charge rail wherein the step of controlling movement of the one vehicle to displace a first charging element of the one vehicle into engagement with the second charging element comprises displacing the first charging element upon engagement between the second guide and the charge rail.

12. The system of claim 2 wherein the first charging element comprises:
   a third displaceable mount configured to facilitate movement of the first charging element in a vertical direction; and
   a fourth displaceable mount configured to facilitate movement of the first charging element in a horizontal direction.

13. The system of claim 12 wherein the first charging element comprises a brush.

14. The system of claim 12 wherein the third displaceable mount comprises a third biasing element biasing the first charging element in a vertical direction.

15. The system of claim 14 wherein the fourth displaceable mount comprises a fourth biasing element biasing the first charging element in a horizontal direction.

16. A method for charging a plurality of vehicles of a material handling system operable to sort, store or retrieve a plurality of items, comprising the steps of:
   loading a plurality of items onto a plurality of vehicles;
   controlling the movement of the plurality of vehicles to deliver the plurality of items, comprising the steps of;
      driving one of the vehicles along a horizontal surface;
      driving the one vehicle vertically;
      transferring an item between the one vehicle and a delivery location;
   recharging a rechargeable power source on the one vehicle that is configured to power the one vehicle during the steps driving the one vehicle along a horizontal surface and driving the one vehicle vertically, comprising the steps of;
      controlling movement of the one vehicle to displace a first charging element of the one vehicle into engagement with a second charging element, wherein the first charging element is electrically connected with the rechargeable power source on the one vehicle and the second charging element is electrically connected with an electrical power source operable to recharge the rechargeable power source of the one vehicle;
      displacing one of the first charging element and the second charging element, comprising the steps of:
         displacing the first or second charging element in a vertical direction; and
         displacing the first or second charging element in a horizontal direction.

17. The method of claim 16 wherein the step of displacing one of the first charging element and the second charging element comprises displacing the second charging element so that the second charging element is displaced relative to the vehicle.

18. The method of claim 17 wherein the step of driving the one vehicle vertically comprises driving the one vehicle up a vertical track.

19. The method of claim 17 comprising the step of biasing the second charging element in a vertical direction.

20. The method of claim 19 comprising the step of biasing the second charging element in a horizontal direction.

21. The method of claim 17 comprising the step of
   displacing the first charging element in a vertical direction; and
   displacing the first charging element in a horizontal direction.

22. The method of claim 21 comprising the step of biasing the first charging element in a vertical direction.

23. The method of claim 22 comprising the step of biasing the first charging element in a horizontal direction.

* * * * *